US012790150B2

(12) United States Patent
Tadomi et al.

(10) Patent No.: US 12,790,150 B2
(45) Date of Patent: Nov. 10, 2026

(54) BELT MODULE

(71) Applicant: CANON KABUSHIKI KAISHA, Tokyo (JP)

(72) Inventors: Takuma Tadomi, Chiba (JP); Keitaro Taoka, Chiba (JP); Yushi Sadamitsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 18/911,952

(22) Filed: Oct. 10, 2024

(65) Prior Publication Data

US 2025/0122039 A1 Apr. 17, 2025

(30) Foreign Application Priority Data

Oct. 13, 2023 (JP) ................................ 2023-177811

(51) Int. Cl.

*B65H 5/02* (2006.01)
*B41J 11/00* (2006.01)
*B41J 29/02* (2006.01)
*G03G 21/16* (2006.01)

(52) U.S. Cl.

CPC ............ *B65H 5/023* (2013.01); *B41J 11/007* (2013.01); *B41J 29/02* (2013.01); *G03G 21/1633* (2013.01); *B65H 2402/32* (2013.01); *B65H 2402/441* (2013.01);

(Continued)

(58) Field of Classification Search

CPC . B41J 11/007; B41J 13/08; B41J 29/02; B41J 29/06; B65H 5/023; B65H 2402/32; B65H 2402/441; B65H 2404/2615; B65H 2601/324; G03G 21/1619; G03G 21/1628; G03G 21/1633; G03G 2221/1684; B65G 15/14; B65G 15/16; B65G 21/10

See application file for complete search history.

(56) References Cited

U.S. PATENT DOCUMENTS 6,349,192 B1 * 2/2002 Yoshino ............ G03G 15/0131 399/302
7,076,189 B2 * 7/2006 Yoshino ............ G03G 15/1605 399/302

(Continued)

FOREIGN PATENT DOCUMENTS

JP 2012256086 A * 12/2012

*Primary Examiner* — Gene O Crawford
*Assistant Examiner* — Keith R Campbell
(74) *Attorney, Agent, or Firm* — Canon U.S.A., Inc. IP Division

(57) ABSTRACT

A belt module includes an apparatus main body and a belt unit. The apparatus main body includes a main body frame, a guide member located inside a belt, a slide member located inside the belt, and a fixing portion configured to fix the guide member to the main body frame. The belt unit includes the belt, a plurality of stretching members, and a belt frame fixed to the slide member and configured to support the plurality of stretching members. The belt module further includes an auxiliary support unit configured to, at the insertion position, support the belt unit, and at the pull-out position, support the belt unit between the upstream end of the belt and the fixing portion. In a case where the belt unit is at the insertion position, the auxiliary support unit and the fixing portion overlap in an insertion direction.

11 Claims, 23 Drawing Sheets

(52) U.S. Cl.
CPC ................ *B65H 2404/2615* (2013.01); *B65H 2601/324* (2013.01); *G03G 2221/1684* (2013.01)

(56) References Cited

U.S. PATENT DOCUMENTS

| | | | | |
|---|---|---|---|---|
| 7,515,848 | B2 * | 4/2009 | Kitozaki | G03G 21/1647 399/113 |
| 7,664,427 | B2 * | 2/2010 | Kawasumi | G03G 21/168 399/110 |
| 12,473,161 | B2 * | 11/2025 | Aoki | B65H 5/023 |
| 12,638,792 | B2 * | 5/2026 | Kuwabara | G03G 15/1615 |
| 2026/0116096 | A1 * | 4/2026 | Iijima | B41J 11/007 |

* cited by examiner

BELT MODULE

BACKGROUND OF THE DISCLOSURE

Field of the Disclosure

The present disclosure relates to a belt module including a belt unit that can be inserted into and pulled out from an apparatus main body.

Description of the Related Art

Japanese Patent Application Laid-Open No. 2012-256086 discusses a configuration where two slide rails are disposed outside a belt so that the belt can be replaced in a state where the belt device is pulled out along the slide rails.

SUMMARY OF THE DISCLOSURE

According to an aspect of the present disclosure, a belt module includes an apparatus main body and a belt unit configured to be inserted into and pulled out from the apparatus main body, the belt unit including an endless belt configured to rotate, the endless belt being replaceable at a pull-out position where the belt unit is pulled out from the apparatus main body, wherein the apparatus main body includes a main body frame, a guide member located inside the endless belt and disposed along a pull-out direction of the belt unit, a slide member located inside the endless belt and configured to slide along the guide member between an insertion position where the belt unit is inserted in the apparatus main body and the pull-out position, and a fixing portion configured to fix the guide member to the main body frame upstream of an upstream end of the endless belt in the pull-out direction at the insertion position and support the belt unit via the slide member and the guide member, wherein the belt unit includes the endless belt, a plurality of stretching members configured to stretch the belt, and a belt frame fixed to the slide member and configured to support the plurality of stretching members, wherein the belt module further comprises an auxiliary support unit configured to, at the insertion position, support the belt unit upstream of the upstream end of the endless belt in the pull-out direction, and at the pull-out position, support the endless belt unit between the upstream end of the belt and the fixing portion in the pull-out direction, and wherein, in a case where the belt unit is at the insertion position, the auxiliary support unit and the fixing portion overlap in an insertion direction.

Further features of the present disclosure will become apparent from the following description of exemplary embodiments with reference to the attached drawings.

DESCRIPTION OF THE EMBODIMENTS

A first exemplary embodiment will be described with reference to FIGS. 1 to 22. A schematic configuration of an image forming system according to the present exemplary embodiment will initially be described with reference to FIG. 1.

[Image Forming System]

An image forming system 1, serving as an image forming apparatus according to the present exemplary embodiment, is a sheet-fed inkjet recording apparatus that uses an inkjet recording method for forming an image on a sheet by discharging ink and forms an ink image on a sheet using two liquids that are a reaction solution and ink. Sheets may be any ink-acceptable recording materials. Examples include paper such as plain paper and thick paper, plastic films such as an overhead projector sheet, sheets of special shapes such as envelopes and index paper, and cloth.

Figure 1:
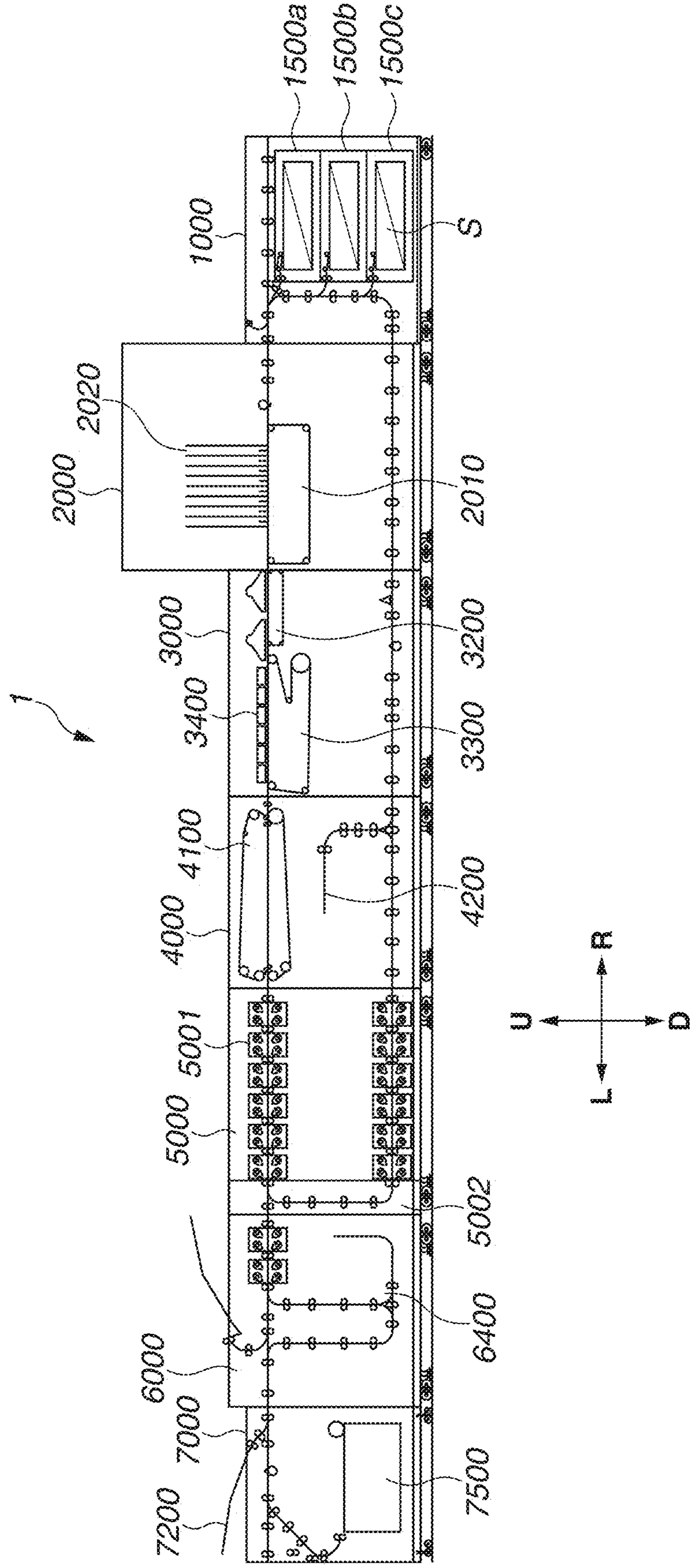
FIG. 1 is a sectional view illustrating a schematic configuration of an image forming system according to a first exemplary embodiment.

As illustrated in FIG. 1, the image forming system 1 according to the present exemplary embodiment includes a feed module 1000, a print module 2000, a drying module 3000, a fixing module 4000, a cooling module 5000, a reversing module 6000, and a stacking module 7000. A sheet S supplied from the feed module 1000 undergoes various types of processing while being conveyed through the modules along conveyance paths, and is finally discharged to the stacking module 7000.

The feed module 1000, the print module 2000, the drying module 3000, the fixing module 4000, the cooling module 5000, the reversing module 6000, and the stacking module 7000 may have respective separate housings, and the housings may be connected to constitute the image forming system 1. Alternatively, the feed module 1000, the print module 2000, the drying module 3000, the fixing module 4000, the cooling module 5000, the reversing module 6000, and the stacking module 7000 may be disposed in a single housing.

The feed module 1000 includes storages **1500*a*, 1500*b*, and 1500*c* for accommodating sheets S. The storages 1500*a*, 1500*b*, and 1500*c* are disposed to be able to be pulled out to the front side of the apparatus to accommodate the sheets S. The sheets S are fed one by one from each of the storages 1500*a* to 1500*c* by separation belts and conveyance rollers, and conveyed to the print module 2000**. The number of storages is not limited to three, and may be one, two, or four or more.

The print module 2000, serving as an image forming unit, includes a pre-image formation registration correction unit (not illustrated), a print belt unit 2010, and a recording unit 2020. The sheet S conveyed from the feed module 1000 is corrected in skew and position by the pre-image formation registration correction unit, and conveyed to the print belt unit 2010. The recording unit 2020 is located to face the print belt unit 2010 along the conveyance path. The recording unit 2020 is an inkjet recording unit that forms an image by discharging ink onto the conveyed sheet S from above, using recording heads. A plurality of recording heads to discharge ink is arranged in the conveyance direction. In the present exemplary embodiment, the print module 2000 includes a total of five line recording heads, including four color recording heads corresponding to yellow (Y), magenta (M), cyan (C), and black (Bk), and an additional recording head corresponding to the reaction liquid. The sheet S is sucked to and conveyed by the print belt unit 2010, whereby a clearance between the sheet S and the recording heads is ensured.

The number of ink colors and the number of recording heads are not limited to five as mentioned above. Various techniques can be employed for the inkjet method, including those using heating elements, piezoelectric elements, electrostatic elements, and microelectromechanical systems (MEMS) elements. The color inks are supplied from not-illustrated ink tanks to the recording heads via respective ink tubes. Each ink contains 0.1 mass % to 20.0 mass % of resin components with respect to the total mass of the ink, as well as water and water-soluble organic solvents, a colorant, wax, and additives.

While the sheet S on which an image is formed by the recording unit 2020 is conveyed by the print belt unit 2010, an in-line scanner (not illustrated) located downstream of the recording unit 2020 in the conveyance direction of the sheet S detects misalignment and color densities of the image formed on the sheet S. Based on the misalignment and color densities of the image, the image to be formed on a sheet S and the color densities are corrected.

The drying module 3000 includes a decoupling unit 3200, a drying belt unit 3300, and a hot air blowing unit 3400. The drying module 3000 reduces the liquid content of the inks and the reaction liquid applied to the sheet S to improve the fixability of the inks to the sheet S by the subsequent fixing module 4000. The image-formed sheet S is conveyed to the decoupling unit 3200 in the drying module 3000. The decoupling unit 3200 blows air from above to cause frictional force between the sheet S and a belt by the wind pressure, and conveys the sheet S using the belt. Conveying the sheet S placed on the belt using the frictional force can prevent the sheet S from shifting when the sheet S is conveyed across the print belt unit 2010 and the decoupling unit 3200. The sheet S conveyed from the decoupling unit 3200 is sucked to and conveyed by the drying belt unit 3300. The hot air blowing unit 3400 located above the drying belt unit 3300 blows hot air to dry the inks and the reaction solution applied to the sheet S.

In such a manner, the drying module 3000 heats the inks and the reaction liquid applied to the sheet S to promote moisture evaporation, whereby cockling can be prevented. The cockling refers to a phenomenon where ink splatters on the sheet S to form rim-like lines around. The drying module 3000 may be any apparatus capable of thermal drying. Desirable examples may include a hot air dryer and a heater. For heaters, heating using an electric heating wire or an infrared heater is desirable in terms of safety and energy efficiency. In addition to the method of applying hot air, the drying method may combine a method of irradiating the surface of the sheet S with electromagnetic waves (such as ultraviolet rays and infrared rays) or a heat conduction method using contact with a heating element.

The fixing module 4000, serving as a fixing system, includes a fixing belt unit 4100 serving as a fixing device. The fixing belt unit 4100 fixes the inks to the sheet S by passing the sheet S conveyed from the drying module 3000 between heated upper and lower belt units. The fixing belt unit 4100 will be described in detail below.

The cooling module 5000 includes a plurality of cooling units 5001, and cools the hot sheet S conveyed from the fixing module 4000 using the cooling units 5001. For example, the cooling units 5001 cool the sheet S by taking the outside air into cooling boxes using fans to increase the pressure inside the cooling boxes and jetting the air from the cooling boxes to the sheet S through nozzles by pressure.

The cooling units 5001 are disposed on both sides of the conveyance path of the sheet S to cool both sides of the sheet S.

The cooling module 5000 includes a conveyance path switching unit 5002. The conveyance path switching unit 5002 switches the conveyance path of the sheet S depending on whether the sheet S is conveyed to the reversing module 6000 or the sheet S is conveyed to a two-sided conveyance path for the sake of two-sided printing to form images on both sides of the sheet S.

The reversing module 6000 includes a reversing unit 6400. The reversing unit 6400 reverses the front and back of the conveyed sheet S to change the orientation of the sheet S, front or back, when the sheet S is discharged to the stacking module 7000. The stacking module 7000 includes a top tray 7200 and a stacking unit 7500, and stacks sheets S conveyed from the reversing module 6000.

During two-sided printing, the sheet S is conveyed to the lower conveyance path of the cooling module 5000 by the conveyance path switching unit 5002. The sheet S is then returned to the print module 2000 through two-sided conveyance paths of the fixing module 4000, the drying module 3000, the print module 2000, and the feed module 1000. The two-sided conveyance path of the fixing module 4000 is equipped with a reversing unit 4200 that reverses the front and back of the sheet S. An ink image is then formed on the other side of the sheet S returned to the print module 2000 where no image has been formed, and the sheet S is discharged to the stacking module 7000 through the drying module 3000, the fixing module 4000, the cooling module 5000, and the reversing module 6000.

[Fixing Module]

Figure 2:
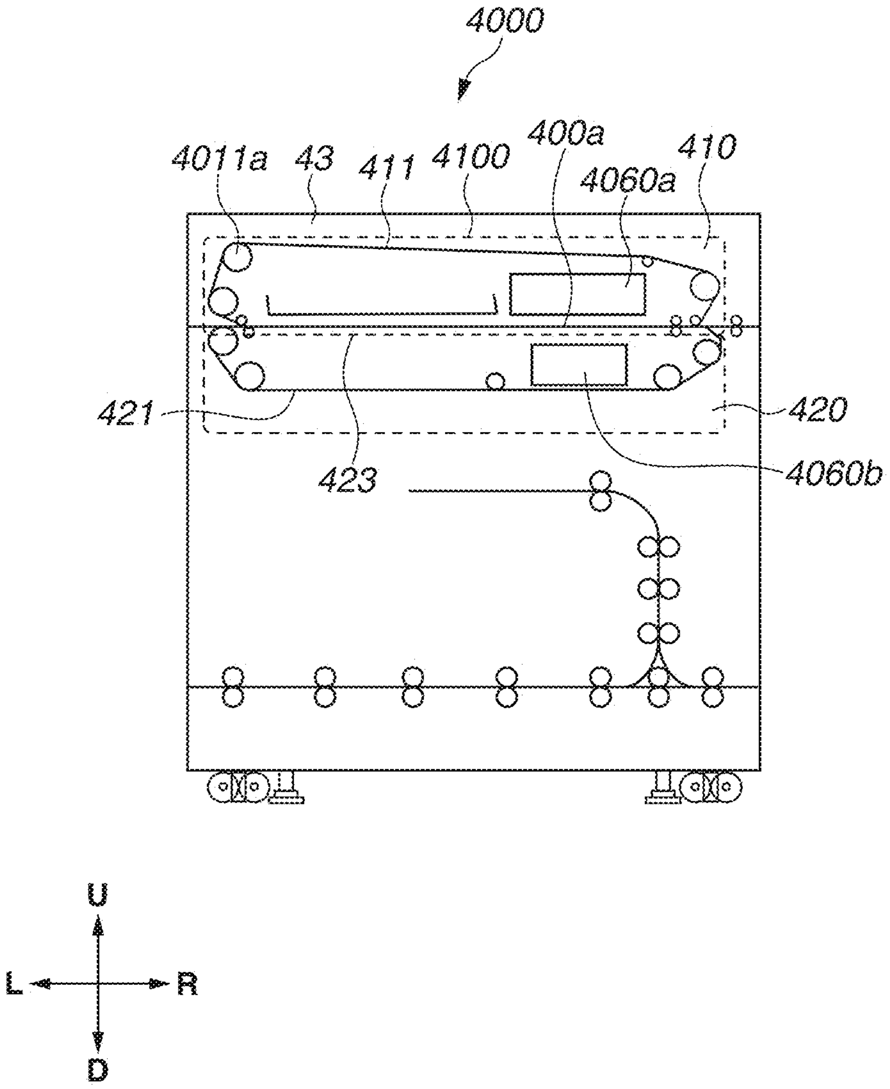
FIG. 2 is a sectional view illustrating a schematic configuration of a fixing module according to the first exemplary embodiment.

Next, the fixing module 4000 will be described in detail with reference to FIG. 2. FIG. 2 is a schematic diagram illustrating the fixing module 4000. The fixing belt unit 4100 is located in the upper part of the fixing module 4000 and serves as a belt module. The fixing belt unit 4100 includes a substantially straight sheet conveyance path 400*a* for receiving the sheet S discharged from the drying module 3000, performing fixing, and passing the sheet S to the cooling module 5000. In the drawings, the near side of the image forming system 1 is referred to as a front direction F, the rear side (far side) a back direction B, the right side as seen from the front a right direction R, the left side as seen from the front a left direction L, the upper side an upward direction U, and the lower side a downward direction D. An operation unit (not illustrated) for the operator to operate is disposed on the near side of the image forming system 1.

The fixing belt unit 4100 includes an upper belt unit 410 and a lower belt unit 420 serving as a belt unit. The upper belt unit 410 is located vertically above the lower belt unit 420. The upper belt unit 410 includes an upper belt 411 that is an example of a fixing belt and a conveyance belt (first conveyance belt), and a tension roller 4011*a* that applies tension to the upper belt 411. In other words, the upper belt unit 410 is an example of a belt unit (first belt unit), and includes the upper belt 411 that conveys the sheet S and is detachably attachable. The lower belt unit 420 is an example of a second belt unit, and includes a lower belt 421, a stretching roller that applies tension to the lower belt 421, and a pad 423 that has an arcuate curved surface. The pad 423 is located to form a nip with the upper belt 411 via the lower belt 421.

The sheet S is sandwiched and conveyed by the nip between the upper belt unit 410 and the lower belt unit 420. In other words, the lower belt 421 is an example of a rotating body and a second conveyance belt, and located to face to the upper belt unit 410 when an upper door unit 43 is at a closed position and the upper belt unit 410 is at an upper accommodation position. Here, the lower belt 421 and the upper belt 411 sandwich and convey the sheet S. The nip pressure is determined by the tension and thickness of the upper belt 411 and the curvature of the pad 423. Too high a nip pressure can cause a phenomenon where the ink on the sheet S adheres to the upper belt unit 410 and exfoliates from the sheet S. The pressure is therefore desirably 1 Pa to 2000 Pa, more desirably 1 Pa to 200 Pa.

As the curvature of the pad 423 increases, a difference between the conveyance paths at the front and back sides of the sheet S increases and possibly causes friction between the sheet S and the belts. Since a large curvature of the pad 423 can cause a phenomenon where the sheet S itself retains the curved shape and curls, the radius of curvature of the pad 423 is desirably 50 mm or more. Moreover, in view of manufacturing precision, the radius of curvature of the pad 423 is desirably less than or equal to 100000 mm. Due to such constraints, in the present exemplary embodiment, the upper belt 411 is configured to have a tension of 200 N and a thickness of 0.3 mm, and the pad 423 a radius of curvature of 30000 mm, so that the nip pressure is approximately 16 Pa.

The use of such a configuration enables uniform pressurization even with the wide nip. This can increase the contact time of the sheet S and the upper belt unit 410 for sufficient heat transfer to the sheet S even in a state where the temperature of the upper belt unit 410 is set to the melting point of the wax or the boiling point of water. Note that if the nip continues to be formed after sufficient heat transfer, the ink can adhere to the upper belt 411 and exfoliate from the sheet S, or the upper belt 411 and the sheet S cause friction to disturb the image. Too long a contact time is therefore undesirable.

For that reason, the time from when the leading edge of the sheet S enters the nip to when the leading edge exits the nip is desirably 0.5 s to 4 s. In the present exemplary embodiment, the pad 423 has a length of 900 mm in the sheet conveyance direction. The sheet S is conveyed at 700 mm/s, so that the time from when the leading edge of the sheet S enters the nip to when the leading edge exits the nip is approximately 1.3 s. Since the presence of moisture is desirable for the ink to permeate into the sheet S, the upper belt 411 and the lower belt 421 are desirably configured to not let moisture through so that when the sheet S becomes hot, the moisture evaporating from the surfaces of the sheet S is not released through the contacting upper belt 411 or lower belt 421.

[Fixing Belt Unit]

Figure 3:
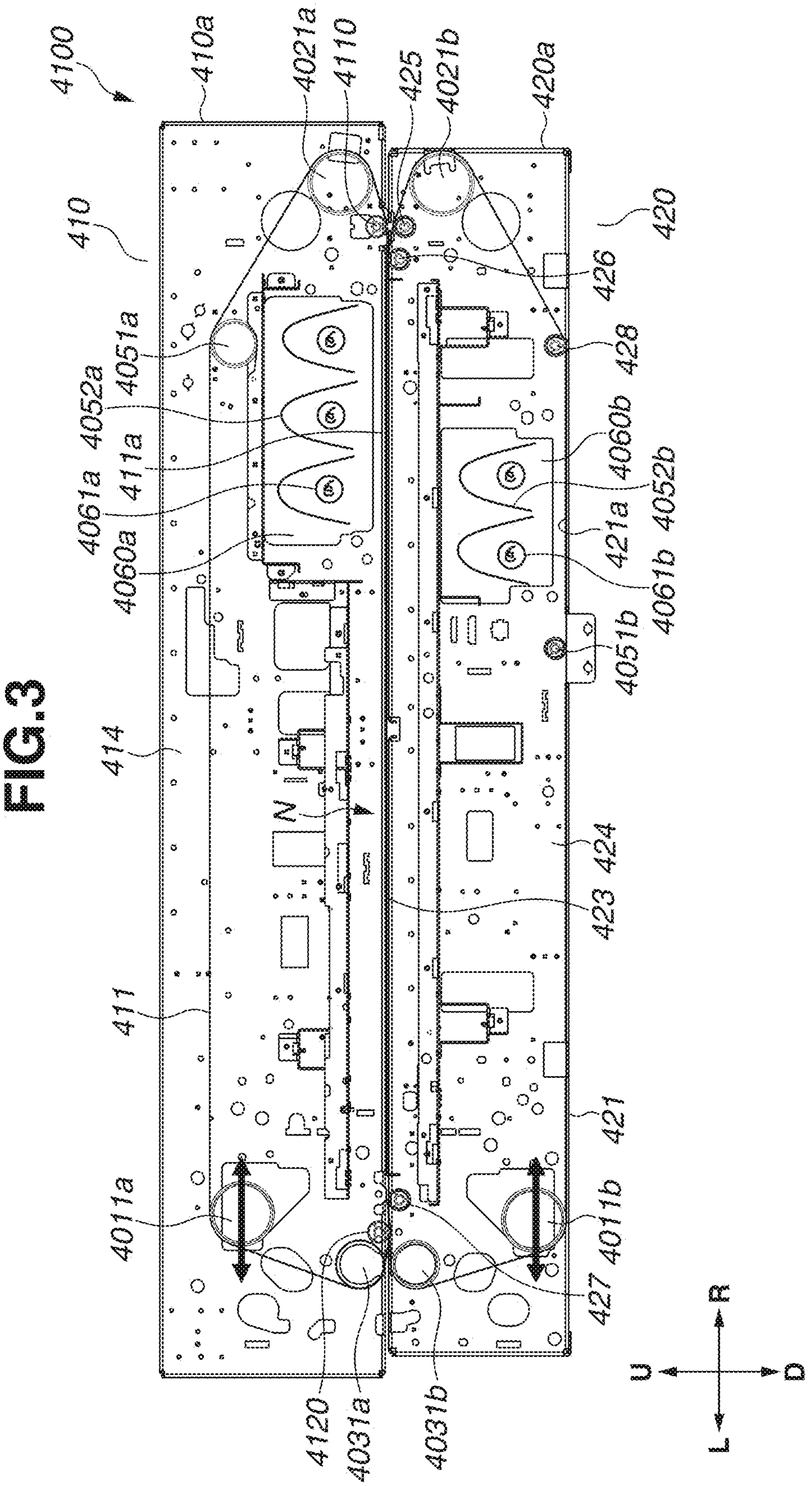
FIG. 3 is a sectional view illustrating a schematic configuration of a fixing belt unit according to the first exemplary embodiment.

Next, the fixing belt unit 4100 according to the present exemplary embodiment will be described with reference to FIG. 3. As illustrated in FIG. 3, the fixing belt unit 4100 serving as a sheet conveyance device and a fixing device includes the upper belt unit 410 as the first belt unit and the lower belt unit 420 as the second belt unit. The upper belt 411 of the upper belt unit 410 and the lower belt 421 of the lower belt unit 420 are pressed against each other to form a nip portion N. While the sheet S is sandwiched and conveyed by the nip portion N, pressure and heat are applied to fix the image formed by the ink to the sheet S.

The upper belt unit 410 includes the upper belt 411 of endless shape serving as a belt and a first belt, a plurality of stretching rollers serving as a plurality of first stretching members for stretching the upper belt 411, and a first heating unit 4060*a* serving as a first heating device. The plurality of stretching rollers includes an entrance roller 4110 serving as a first roller, an exit roller 4120 serving as a second roller, a driving roller 4031*a*, the tension roller 4011*a*, a guide roller 4051*a*, and a steering roller 4021*a*. These rollers are arranged in order from upstream of the nip portion N in the rotation direction of the upper belt 411. The rotation path of the upper belt 411 is thereby formed. The nip portion N lies between the entrance roller 4110 and the exit roller 4120. In other words, the entrance roller 4110 and the exit roller 4120 are arranged with the nip portion N therebetween in the rotation direction of the nip portion N. The rollers are supported on an upper frame 414 serving as a first frame that is the housing of the upper belt unit 410. The first roller may be the exit roller 4120 and the second roller may be the entrance roller 4110. Basically, the first roller and the second roller can be any rollers arranged with the nip portion N therebetween.

The first heating unit 4060*a* is located inside the upper belt 411. The first heating unit 4060*a* includes first heater units 4061*a*, and reflectors 4052*a* serving as reflection members and first reflection members. The first heating unit 4060*a* is detachably attachable to a first belt unit main body 410*a* including the upper belt 411. The first belt unit main body 410*a* includes the upper belt 411, the plurality of stretching rollers for stretching the upper belt 411, and the upper frame 414.

The first heater units 4061*a* are disposed to not contact the upper belt 411 and along the width direction of the upper belt 411 intersecting the rotation direction of the upper belt 411, and radiate heat to heat the upper belt 411. The reflectors 4052*a* are disposed along the width direction, and reflect the radiant heat from the first heater unit 4061*a* toward a predetermined area of the upper belt 411.

In the present exemplary embodiment, the first heating unit 4060*a* of the upper belt unit 410 is located inside the upper belt 411 and above the nip portion N, and heats the upper belt 411 from inside. The first heating unit 4060*a* includes the plurality of first heater units 4061*a*. In the present exemplary embodiment, three first heater units 4061*a* are juxtaposed in the rotation direction of the upper belt 411. The reflectors 4052*a* are located to surround the first heater units 4061*a* except where the first heater units 4061*a* face the upper belt 411.

As many reflectors 4052*a* as the first heater units 4061*a* are disposed to correspond to the first heater units 4061*a*. The reflectors 4052*a* are formed to open toward the nip portion N of the first heater unit 4061*a* and cover both widthwise ends of the first heater units 4061*a*. The radiant heat from the first heater units 4061*a* is thus efficiently radiated toward the nip portion N by the reflectors 4052*a*.

In the upper belt unit 410, the predetermined area refers to an area (first area) of the inner peripheral surface of the upper belt 411 within the nip portion N. The plurality of first heater units 4061*a* and the plurality of reflectors 4052*a* directly heat the nip portion N. This enables efficient heat transfer to sheet S passing through the nip portion N. In the present exemplary embodiment, the area for the plurality of first heater units 4061*a* to heat within the nip portion N is an inner peripheral surface (lower surface portion) of the upper belt 411. More specifically, the area refers to a lower surface portion 411*a* located upstream of the center position of the nip portion N in the conveyance direction of the sheet S passing through the nip portion N. In other words, in the present exemplary embodiment, the predetermined area of the upper belt unit 410 is the lower surface portion 411*a*.

The lower surface portion 411*a* is located to face the lower belt 421 that is stretched between a nip upstream roller 426 and a nip downstream roller 427 among stretching rollers for the lower belt 421 to be described below. Here, the lower surface portion 411*a* is opposed to an area where the lower belt 421 is supported by the pad 423 located between the rollers. The distance between the lower surface portion 411*a* of the upper belt 411 and the first heating unit 4060*a* is thereby maintained substantially constant regardless of the rotation of the upper belt 411.

The lower belt unit 420 includes the lower belt 421 of endless shape serving as a belt and a second belt, a plurality of stretching rollers serving as a plurality of stretching members (second stretching members) for stretching the lower belt 421, and a second heating unit 4060*b* serving as a heating section (second heating device). The plurality of stretching rollers includes a nip upstream guide roller 425, the nip upstream roller 426, the nip downstream roller 427, the driving roller 4031*b*, a tension roller 4011*b*, a guide roller 4051*b*, a guide roller 428, and a steering roller 4021*b*. These rollers are arranged in order from upstream of the nip portion N in the rotation direction of the lower belt 421.

The nip portion N lies between the nip upstream roller 426 and the nip downstream roller 427, where the pad 423 is located. In other words, the nip upstream roller 426, serving as a third roller, and the nip downstream roller 427, serving as a fourth roller, are located with the nip portion N therebetween in the rotation direction of the lower belt 421. The pad 423, serving as a support member, contacts the inner peripheral surface of the lower belt 421 within the nip portion N to support the lower belt 421. In other words, the nip upstream roller 426 and the nip downstream roller 427 are located on both sides of the pad 423 in the rotation direction of the lower belt 421. The distance between the nip upstream roller 426 and the nip downstream roller 427 is shorter than the distance between the entrance roller 4110 and the exit roller 4120. The rotation path of the lower belt 421 is formed by these rollers and the pad 423. The rollers and the pad 423 are supported on a lower frame 424 serving as a belt frame (second frame) that is the housing of the lower belt unit 420.

The second heating unit 4060*b* is located inside the lower belt 421. The second heating unit 4060*b* includes second heater units 4061*b*, and reflectors 4052*b* serving as reflection members and second reflection members. The second heating unit 4060*b* is detachably attachable to a second belt unit main body 420*a* including the lower belt 421. The second belt unit main body 420*a* includes the lower belt 421, the plurality of stretching rollers for stretching the lower belt 421, the pad 423, and the lower frame 424.

The second heater units 4061*a* are disposed to not contact the lower belt 421 and along the width direction of the lower belt 421 intersecting the rotation direction of the lower belt 421, and radiate heat to heat the lower belt 421. The reflectors 4052*b* are disposed along the width direction, and reflect the radiant heat from the second heater units 4061*b* toward a predetermined area of the lower belt 421.

In the present exemplary embodiment, the second heating unit 4060*b* of the lower belt unit 420 is located inside the lower belt 421 and below the nip portion N, and heats the lower belt 421 from inside. The second heating unit 4060*b* includes the plurality of second heater units 4061*b*. In the present exemplary embodiment, two second heater units 4061*b* are juxtaposed in the rotation direction of the lower belt 421. The reflectors 4052*b* are located to surround the second heater units 4061*b* except where the second heater units 4061*b* face the lower belt 421.

As many reflectors 4052*b* as the second heater units 4061*b* are disposed to correspond to the second heater units 4061*b*. The reflectors 4052*b* are formed to open below the second heater units 4061*b* and cover both widthwise ends of the second heater units 4061*b*. The radiant heat from the second heater units 4061*b* is thus efficiently radiated toward a lower portion of the lower belt 421 by the reflectors 4052*b*.

In other words, the predetermined area of the lower belt unit 420 refers to an area (second area) of the inner peripheral surface of the lower belt 421 off the nip portion N. In the present exemplary embodiment, the area refers to the lower portion of the lower belt 421. Specifically, the area for the plurality of second heater units 4061*b* to heat off the nip portion N is the inner peripheral surface (lower surface portion) of the lower belt 421 between the guide roller 4051*b* and the guide roller 428 in the rotation direction of the lower belt 421. More specifically, the predetermined area of the lower belt unit 420 refers to a lower surface portion 421*a* of the lower belt 421. The lower surface portion 421*a* is the surface of the lower belt 421 substantially horizontally stretched by the guide roller 4051*b* and the guide roller 428. As described above, the lower belt unit 420 includes the pad 423 at the position corresponding to the nip portion N. Unlike the upper belt unit 410, the lower belt unit 420 is therefore unable to directly heat the nip portion N. The plurality of second heater units 4061*a* and the plurality of reflectors 4052*b* are therefore directed toward the lower surface portion 421*a* of the lower belt 421 to directly heat the lower belt 421 in an efficient manner.

The lower surface portion 421*a* that is the area of the lower belt 421 to be heated by the plurality of second heater units 4061*b* and the plurality of reflectors 4052*b* is located upstream of the nip upstream guide roller 425 at the entrance of the nip portion N in the rotation direction of the lower belt 421, with the steering roller 4021*b* therebetween. The lower surface portion 421*a* is also located between the guide roller 428 and the tension roller 4011*b* that stretch the lower portion of the lower belt 421, downstream of the center position between the two rollers in the rotation direction of the lower belt 421. The plurality of second heater units 4061*b* and the plurality of reflectors 4052*b* can thus heat the lower belt 421 at a position relatively close to the nip portion N. This enables efficient heat transfer to the sheet S passing through the nip portion N.

As described above, in the upper belt unit 410, the pad 423 maintains the distance between the upper belt 411 and the first heating unit 4060*a* substantially constant regardless of the rotation of the upper belt 411. This stabilizes the thermal effect of the first heater units 4061*a* on the upper belt 411. In the lower belt unit 420, the tension roller 4011*b* and the guide roller 428 stretch the lower belt 421 upstream and downstream of the second heating unit 4060*b*, whereby the distance between the lower belt 421 and the second heating unit 4060*b* is maintained substantially constant regardless of the rotation of the lower belt 421. This stabilizes the thermal effect of the second heater units 4061*b* on the lower belt 421.

The first heater units 4061*a* and the second heater units 4061*b* may be any heaters that radiate heat to heat the belts. Examples include halogen heaters. In the present exemplary embodiment, the first and second heater units 4061*a* and 4061*b* are halogen heaters.

As described above, the reflectors 4052*a* and 4052*b* for efficiently concentrating light onto the upper belt 411 and the lower belt 421 are disposed around the first heater units 4061*a* and the second heater units 4061*b*, respectively. For efficient light reflection, the reflectors 4052*a* and 4052*b* are made of mirror-finished aluminum members, for example. The heater output of the plurality of first heater units 4061*a* and the plurality of second heater units 4061*b* is controlled based on temperatures detected by not-illustrated temperature detection units. The upper and lower belts 411 and 412 are thereby maintained at appropriate temperatures.

In the present exemplary embodiment, the method for directly heating the belts from inside using halogen heaters has been described as an example. However, planar heating elements or induction heating (IH) elements may be used for the heaters. Alternatively, aluminum heating rollers with built-in halogen heaters may be brought into contact with the belts for indirect heating. External heating units may be used to heat the belts from the outer surfaces.

[Stretching Rollers in Each Belt Unit]

The tension rollers 4011*a* and 4011*b*, the steering rollers 4021*a* and 4021*b*, and the driving rollers 4031*a* and 4031*b* of the foregoing upper and lower belt units 410 and 420 will be described. Since the functions of the rollers are the same for both the upper belt unit 410 and the lower belt unit 420, the rollers of the lower belt units 420 will now be described as an example.

[Tension Roller]

The tension roller 4011*b* will initially be described with reference to FIG. 3. One of the plurality of stretching rollers included in the lower belt unit 420 is the tension roller 4011*b* that applies tension to the lower belt 421. The tension roller 4011*b* is located on the side (downward direction D) opposite to the side (upward direction D) where the nip portion N is formed, and stretches the lower belt 421. In the present exemplary embodiment, between the nip upstream roller 426 and the nip downstream roller 427 that form the nip portion N, the tension roller 4011*b* is located downstream of the nip downstream roller 427 in the rotation direction of the lower belt 421. Specifically, the tension roller 4011*b* is located even downstream of the driving roller 4031*b* that is located downstream of the nip downstream roller 427 in the rotation direction of the lower belt 421.

The tension roller 4011*b* is supported to be movable in a predetermined direction (in the present exemplary embodiment, the direction of the arrow illustrated in FIG. 3), and pressed by a belt tension application spring 4501 (see FIG. 14 to be described below) serving as a biasing member (pressure member). For example, if the circumferential length of the lower belt 421 changes from its intended length due to manufacturing variations or a change in the use condition, the stretching state of the lower belt 421 can be stabilized by the pressurization of the tension roller 4011*b* by the pressure member.

Specifically, in the present exemplary embodiment, the tension roller 4011*b* of the lower belt unit 420 is configured so that the tension roller 4011*b* is supported to be movable in a horizontal direction (left direction L and right direction R). Moreover, the tension roller 4011*b* is located so that the tension roller 4011*b*, the guide roller 4051, the heating section including the second heating unit 4060*b*, and the guide roller 428 are arranged in this order from upstream in the rotation direction of the lower belt 421. Such a layout according to the present exemplary embodiment can prevent the distance between the second heating unit 4060*b* and the lower belt 421 from changing even if the position of the tension roller 4011*b* moves horizontally due to variations in the circumferential length of the lower belt 421. The tension roller 4011*a* for the upper belt 411 is also configured so that the tension roller 4011*a* is horizontally movably supported.

[Steering Roller]

Figure 4:
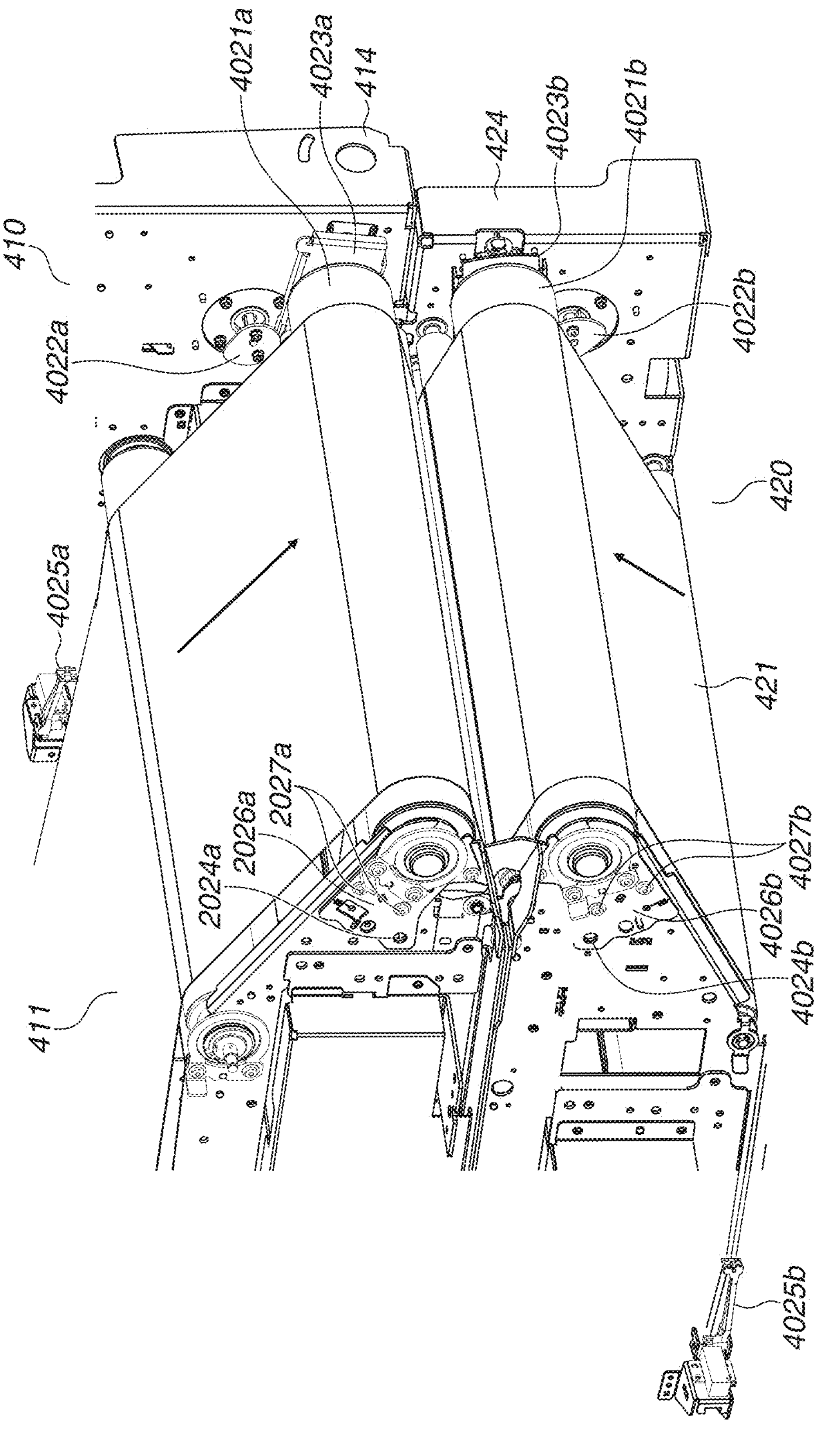
FIG. 4 is a perspective view illustrating a configuration of steering units of the fixing belt unit according to the first exemplary embodiment.

Next, the steering roller 4021*b* will be described with reference to FIGS. 3 to 5. FIG. 4 is a schematic perspective view illustrating the vicinity of the steering rollers of the fixing belt unit 4100.

Figure 5:
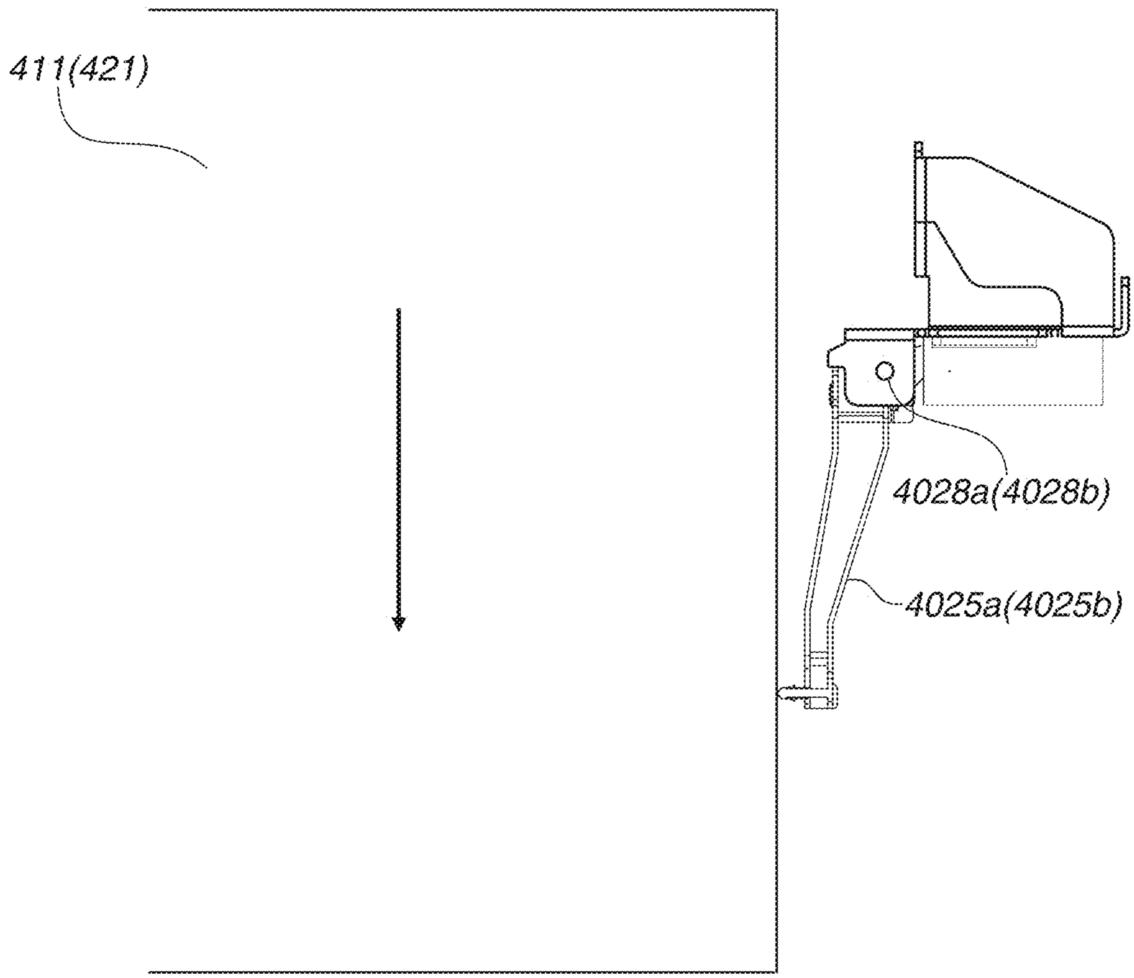
FIG. 5 is a plan view illustrating a relationship between a belt and an edge sensor according to the first exemplary embodiment.

FIG. 5 is a plan view illustrating a relationship between the upper belt 411 (lower belt 421) and an edge sensor 4025*a* (4025*b*). One of the plurality of stretching rollers included in the lower belt unit 420 is the steering roller 4021*b* for controlling the position of the lower belt 421 in the front-to-back direction (the front direction F and the back direction B, or the width direction of the lower belt 421).

The steering roller 4021*b* is a metal roller made of aluminum or iron, for example. One end of the steering roller 4021*b* in the front-to-back direction is rotatably supported by a fixing plate 4026*b*. The fixing plate 4026*b* is fastened to the lower frame 424 with screws 4027*b*. The other end of the steering roller 4021*b* in the front-to-back direction is rotatably supported by a steering arm 4023*b*. The steering arm 4023*b* is supported by the lower frame 424 to be rotatable about a rotation center 4024*b*. A steering cam 4022*b* having an eccentric radius is in contact with a part of the steering arm 4023*b*. The alignment of the steering roller 4021*b* can be changed by rotating the steering cam 4022*b* using a not-illustrated steering motor.

The fixing plate 4026*b* is configured so that the rotation center position of the steering roller 4021*b* can be moved by loosening the screws 4027*b* from the lower frame 424. The fixing plate 4026*b* is also configured so that the alignment can be adjusted by fastening the screws 4027*b* again. The optimum alignment position of the steering roller 4021*b* can thereby be fine-adjusted depending on variations in the installation environment, for example.

The nip upstream guide roller 425 is located downstream of the steering roller 4021*b* included in the lower belt unit 420 in the rotation direction of the lower belt 421. Such a layout is intended to stabilize the path of the lower belt 421 immediately before the nip portion N regardless of the orientation of the steering roller 4021*b*. The entry of the conveyed sheet S into the nip portion N can be stabilized by conveying the sheet S in orientation along the lower belt 421.

Next, the control of the position of the lower belt 421 in the front-to-back direction by the steering roller 4021*b* will be described with reference to FIGS. 4 and 5. As the upper belt unit 410 and the lower belt unit 420 have slightly different configurations, each will be described separately.

The edge sensor 4025*b* for contacting an end surface of the lower belt 421 to detect the position of the lower belt 421 in the front direction F is located at one end of the lower belt 421 in the front-to-back direction (in the present exemplary embodiment, the end in the front direction F), on the downward direction D side of the lower belt 421. In the lower belt unit 420, the guide roller 428 is located so that the surface of the lower belt 421 stretched between the tension roller 4011*b* and the guide roller 428 is substantially in parallel with the moving direction (horizontal direction) of the tension roller 4011*b*. The edge sensor 4025*b* is located between the tension roller 4011*b* and the guide roller 428, whereby the effect of the belt path on the edge sensor 4025*b* due to variations in the circumferential length of the lower belt 421 is reduced.

The amount of rotation of the steering cam 4022*b* is controlled based on the detection value of the edge sensor 4025*b*. A rotation center 4028*b* of the edge sensor 4025*b* is set so that when the lower belt 421 rotates, the edge sensor 4025*b* undergoes a force in a direction away from the lower belt 421 due to a frictional force from the lower belt 421. This can reduce load acting between the edge sensor 4025*b* and the end surface of the lower belt 421.

An edge sensor 4025*a* for contacting the end surface of the upper belt 411 to detect the position of the upper belt 411 in the back direction B is located at the other end of the upper belt 411 in the front-to-back direction (in the present exemplary embodiment, the end in the back direction B), on the upward direction U side of the upper belt 411. In the upper belt unit 410, the guide roller 4051*a* is located so that the surface of the upper belt 411 stretched between the tension roller 4011*a* and the guide roller 4051*a* is substantially in parallel with the moving direction (horizontal direction) of the tension roller 4011*a*. The edge sensor 4025*a* is located between the tension roller 4011*a* and the guide roller 4051*a*, whereby the effect of the belt path on the edge sensor 4025*a* due to variations in the circumferential length of the upper belt 411 is reduced.

The amount of rotation of the steering cam 4022*a* is controlled based on the detection value of the edge sensor 4025*a*. A rotation center 4028*a* of the edge sensor 4025*a* is set so that when the upper belt 411 rotates, the edge sensor 4025*a* undergoes a force in a direction away from the upper belt 411 due to a frictional force from the upper belt 411. This can reduce load acting between the edge sensor 4025*a* and the end surface of the upper belt 411.

As illustrated in FIG. 5, the edge sensor 4025*b* is located at the end of the lower belt 421 in the front direction F and on the downward direction D side, and the edge sensor 4025*a* is located at the end of the upper belt 411 in the back direction B and on the upward direction U side. This enables the use of edge sensors of the same shape for the upper belt 411 and the lower belt 421.

The steering rollers according to the present exemplary embodiment are described to be metal rollers. However, rollers with a heat-resistant rubber or other rubber layer on their surface may be used to increase frictional force for improved steering performance. While the steering rollers are configured to be fixed at one end and moved at the other end to change alignment, both ends may be movably supported to change alignment.

[Driving Roller]

Next, the driving roller 4031*b* will be described with reference to FIG. 3. One of the plurality of stretching rollers included in the lower belt unit 420 is the driving roller 4031*b* for providing driving force for the lower belt 421.

The driving roller 4031*b* is a metal roller made of aluminum or iron, for example. The driving roller 4031*b* is rotatably supported by the lower frame 424 at both ends in the front-to-back direction. Drive is input to the driving roller 4031*b* using a not-illustrated drive transmission mechanism, such as gears and a timing belt, whereby the driving roller 4031*b* is rotated to rotate the lower belt 421 in a predetermined direction by frictional force.

In the present exemplary embodiment, the lower belt 421 and the upper belt 411 are rotated by independently providing driving force using the driving roller 4031*a* and the driving roller 4031*b*, respectively. While in the present exemplary embodiment the driving rollers 4031*a* and 4031*b* are described to be metal rollers, rollers with a heat-resistant rubber or other rubber layer on their surface may be used to increase frictional force for improved driving performance.

[Jam Handling]

If a sheet jam or conveyance slip occurs in the sheet conveyance path 400*a* (FIG. 2) and the sheet S goes off a predetermined conveyance timing, the fixing module 4000 (hereinafter, may be referred to as the apparatus) detects the jam or slip (hereinafter, referred to as a jam). In such a case, the apparatus automatically discharges the sheet S remaining in the sheet conveyance path 400*a* to a purge tray. If the remaining sheet S is unable to be discharged to the purge tray, the user desirably removes the remaining sheet S. The sheet S is sandwiched and conveyed by the nip portion N between the upper belt unit 410 and the lower belt unit 420. If a jam occurs and the sheet S remains in the nip portion N, the user opens the nip portion N and removes the remaining sheet S.

For that purpose, at least one of the upper and lower belt units 410 and 420 is configured to be movable with respect to the other belt unit, between a nip position where the upper belt 411 and the lower belt 421 form the nip portion N and a separated position where the upper belt 411 and the lower belt 421 are separated compared to at the nip position. A specific description will now be given.

Figure 6:
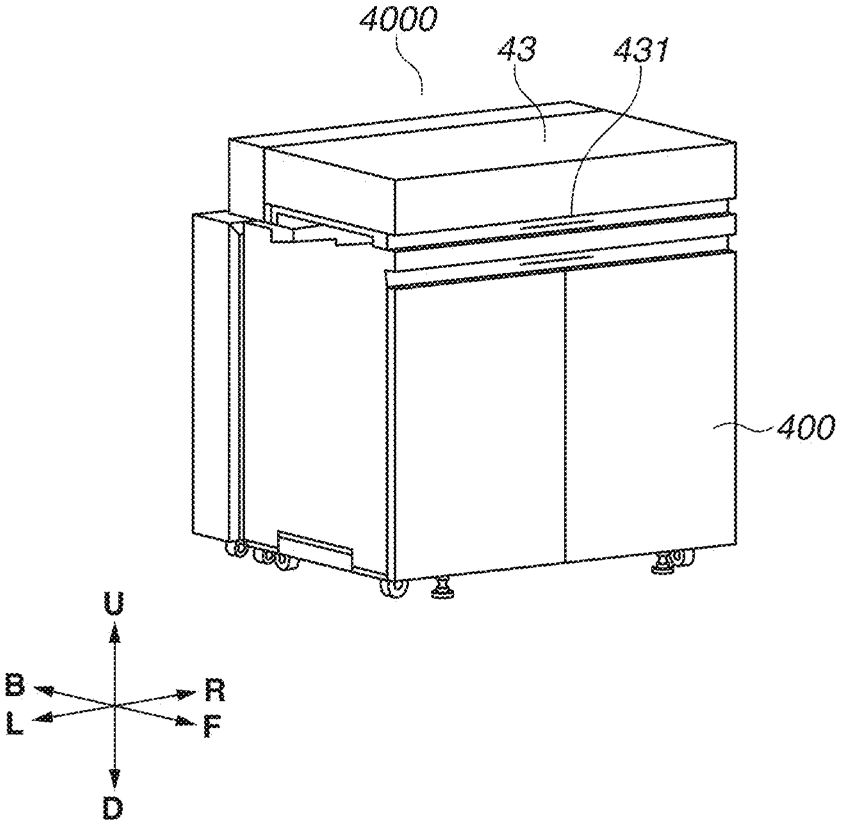
FIG. 6 is a perspective view illustrating a first state where an upper door unit of the fixing module according to the first exemplary embodiment is located at a closed position.
Figure 7:
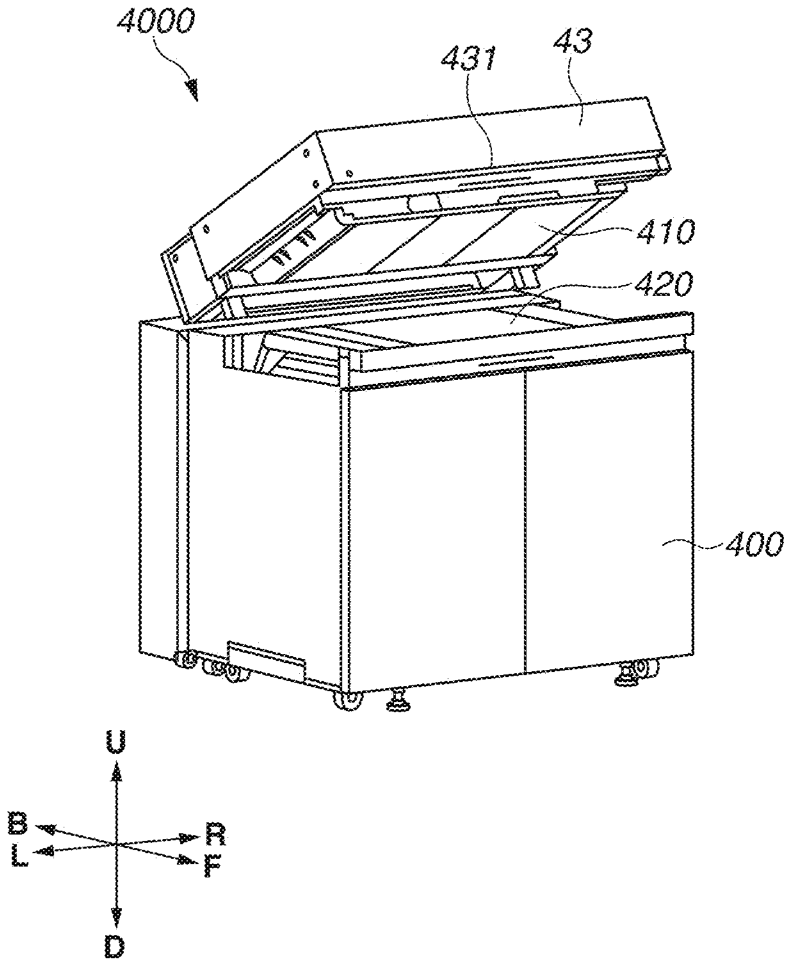
FIG. 7 is a perspective view illustrating a second state where the upper door unit of the fixing module according to the first exemplary embodiment is located at an open position and an upper belt unit is located at an upper accommodation position.
Figure 8:
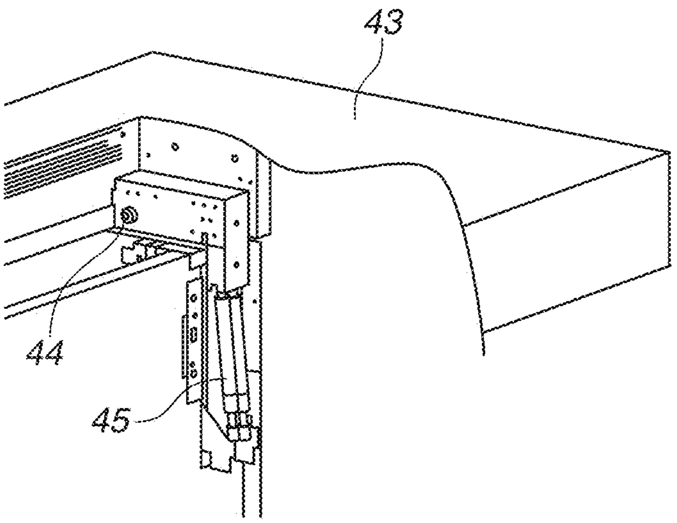
FIG. 8 is a perspective view illustrating a gas spring with the upper door unit of the fixing module according to the first exemplary embodiment at the closed position.
Figure 9:
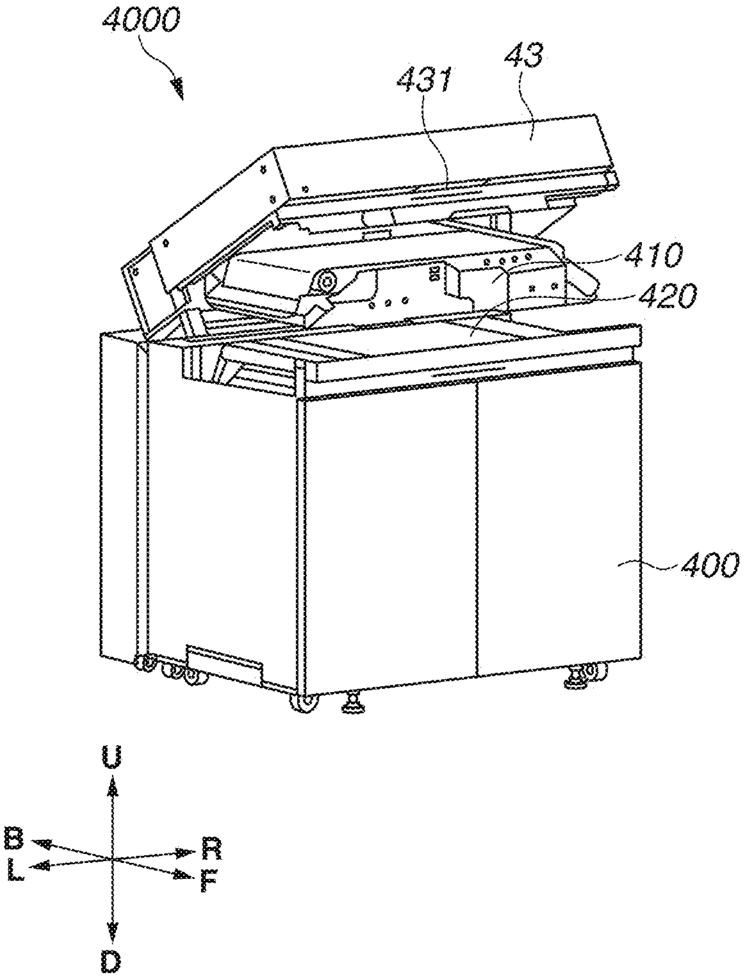
FIG. 9 is a perspective view illustrating a third state where the upper door unit of the fixing module according to the first exemplary embodiment is located at the open position and the upper belt unit is located at a maintenance position.
Figure 10A:
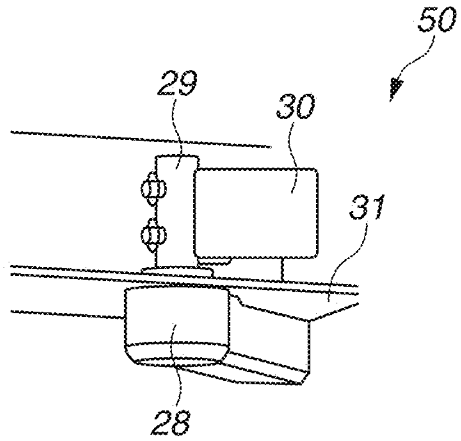
FIGS. 10A and 10B are a perspective view and a bottom view, respectively, illustrating a lock mechanism of the fixing module according to the first exemplary embodiment.
Figure 10B:
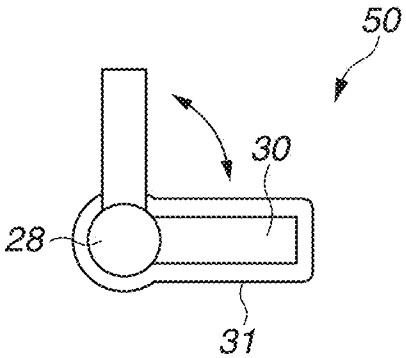

As illustrated in FIGS. 6 to 8, the fixing module 4000 includes an upper door unit 43 serving as a first housing that is openable in the upward direction U. The upper belt unit 410 of the fixing belt unit 4100 is disposed inside the upper door unit 43. The upper door unit 43 is configured to be openable in the upward direction U along with the upper belt unit 410. The upper door unit 43 is rotatably connected to an apparatus main body 400 serving as a second housing by support shafts 44 (see FIG. 8) located on the back direction B side of the apparatus main body 400. The support shafts 44 serving as rotation shafts are located on the rear side of the apparatus main body 400 in the sheet width direction (front-to-back direction) intersecting the sheet conveyance direction, and disposed along the sheet conveyance direction. The upper door unit 43 is disposed on the apparatus main body 400 to be rotatable about the support shafts 44.

The upper door unit 43 includes a grip 431 on the front direction F side of the apparatus main body 400. Lifting up the grip 431 in the upward direction U rotates and opens the upper door unit 43. The upper door unit 43 is an example of an accommodation unit. The upper door unit 43 is provided separate from the upper belt unit 410, can accommodate the upper belt unit 410, and can move to a closed position (see FIG. 6) and an open position (see FIGS. 7 and 9) with respect to the apparatus main body 400 by rotation. The closed position corresponds to the nip position where the upper belt 411 and the lower belt 421 form the nip portion N. The open position corresponds to the separated position where the upper belt 411 and the lower belt 421 are separated compared to at the nip position. In the present exemplary embodiment, the upper door unit 43 includes a top plate and side plates, and has a function as an upper cover of the apparatus main body 400. The upper door unit 43 is not limited to one having only the cover function. For example, a display unit and/or an operation unit may be integrated with the upper door unit 43.

When a jam occurs, the user can lift up the grip 431 of the upper door unit 43 to open the upper door unit 43 upward into the separated position, and remove the sheet S remaining inside the apparatus main body 400 from in front of the apparatus. In the present exemplary embodiment, a gas spring 45 is provided to improve the operability when the user opens and closes the upper door unit 43. The gas spring 45 biases the upper door unit 43 toward the open position.

In the present exemplary embodiment, the upper door unit 43 is disposed to be rotatable between the horizontal closed position and the open position that is 30° inclined from the horizontal direction. The gas spring 45 has biasing force such that when the opening angle of the upper door unit 43 is less than or equal to a first angle with respect to the horizontal direction, the upper door unit 43 and the upper belt unit 410 rotate to the closed position due to their own weight. The upper door unit 43 is brought into contact with a not-illustrated abutting portion on the apparatus main body (housing) 400 and fixed at the closed position by biasing force due to its own weight. The first angle here is 5°, for example. The biasing force of the gas spring 45 is also such that when the opening angle of the upper door unit 43 is greater than or equal to a second angle with respect to the horizontal direction, the upper door unit 43 is rotated to the open position. The second angle here is 20°, for example. The provision of the gas spring 45 improves the operability since the upper door unit 43 closes automatically at an opening angle of 5° or less and opens automatically at an opening angle of 20° or more.

In the present exemplary embodiment, to improve the operability, the combined force of the reaction force from the gas spring 45 and the weight of the upper door unit 43 and the upper belt unit 410 at the closed position is set to act in the direction toward the closed position. Specifically, the layout and load settings of the gas spring 45 are set to the direction of closing the upper door unit 43. Alternatively, the gas spring 45 may be set so that a force toward the open position acts even at the closed position (easy-to-open settings), and the upper door unit 43 may be fixed at the closed position using a latch mechanism.

[Parts Replacement Operation of Upper Belt Unit]

The upper belt unit 410 of the fixing belt unit 4100 includes parts such as the upper belt 411, the plurality of stretching rollers, a roller driving unit (not illustrated), the first heater units 4061*a*, and sensors (not illustrated). These parts have a risk of failure during the product's lifetime, and are desirably replaceable in the market to accommodate regular replacements and replacements due to accidental failures. In the commercial printing market, product uptime is the top priority for users, and it is desirable for the replacement operation to be performed promptly and reliably.

The present exemplary embodiment employs a configuration where the parts of the upper belt unit 410 can be replaced with the upper door unit 43 opened upward. The configuration will now be described with reference to FIGS. 9 to 11. In performing operations such as parts replacement, cleaning, and lubrication, the grip 431 located on the front direction F side of the upper door unit 43 is lifted in the upward direction U to rotate the upper door unit 43 upward and open the sheet conveyance path 400*a*. The upper door unit 43 is held at the open position (see FIG. 7) by a holding member (not illustrated).

Figure 11:
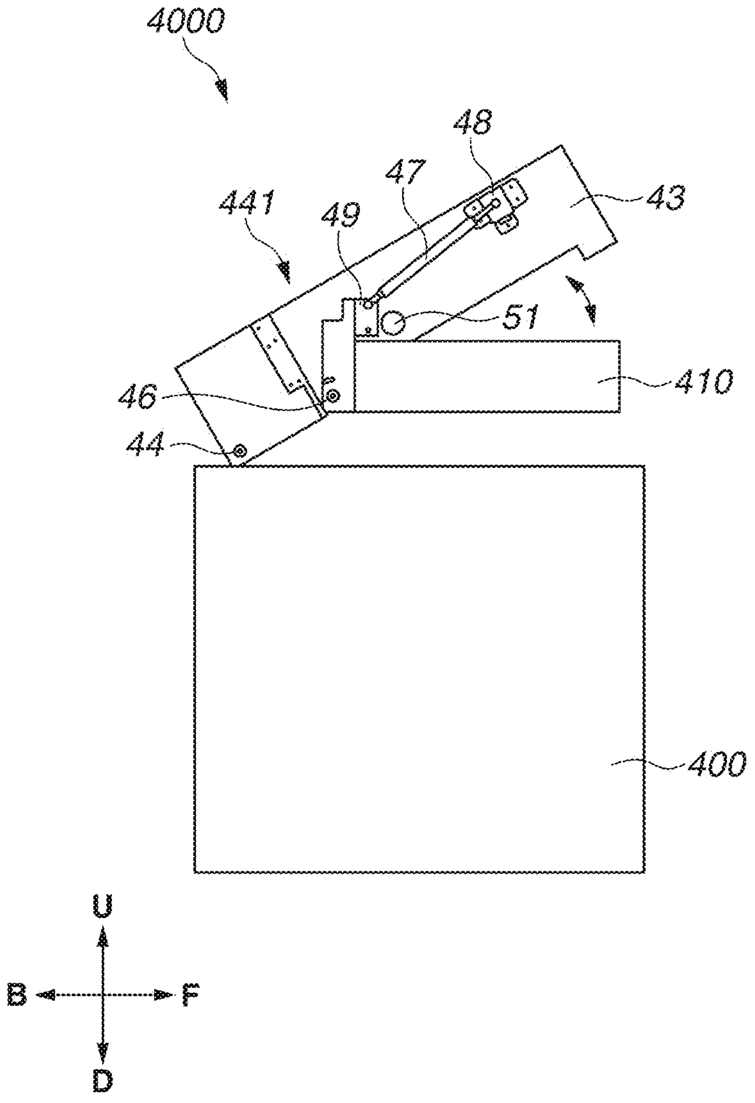
FIG. 11 is a sectional view illustrating the third state of the fixing module according to the first exemplary embodiment, seen from a side.

As illustrated in FIG. 11, the fixing module 4000 includes a first displacement unit 441 serving as a displacement unit. The first displacement unit 441 is provided to displace the upper belt unit 410 with respect to the upper door unit 43, between the upper accommodation position (see FIG. 7) where the upper belt unit 410 is accommodated in the upper door unit 43 and a maintenance position (see FIGS. 9 and 11) where the upper belt unit 410 protrudes from the upper door unit 43. The first displacement unit 441 includes a rotation shaft 46, a stopper 51 that is an example of a holding unit, and a gas spring 47.

The rotation shaft 46 is located on the rear side of the upper door unit 43 in the sheet width direction (front-to-back direction) when the upper door unit 43 is at the closed position, and disposed along the sheet conveyance direction. The upper belt unit 410 is disposed to be rotatable about the rotation shaft 46. The upper belt unit 410 located inside the upper door unit 43 is supported to be rotatable with respect to the upper door unit 43 by the rotation shaft 46 located on the back direction B side of the upper door unit 43. The upper belt unit 410 is fixed to the upper door unit 43 by a lock mechanism 50 (see FIGS. 10A and 10B) disposed on the near side of the upper door unit 43.

A configuration of the lock mechanism 50 will be described. The lock mechanism 50 includes a lock lever 28, a rotation shaft 29, a lock member 30, and a lock hole 31. The lock lever 28 is disposed to be rotatable about the rotation shaft 29 within a predetermined angle. The lock member 30 is fixed to the rotation shaft 29. As the lock lever 28 rotates, the rotation shaft 29 can rotate the lock member 30 from a locked position to an unlocked position. The lock hole 31 for the rotation shaft 29 to be inserted through is formed in the upper door unit 43. The lock hole 31 is shaped so that the lock member 30 positioned at an unlocked angle passes through. The locking can be unlocked at this position.

When the lock lever 28 of the lock mechanism 50 is rotated to unlock with the upper door unit 43 opened in the upward direction U, the upper belt unit 410 rotates about the rotation shaft 46 so that the near side of the upper belt unit 410 rotates downward due to its own weight. In such a manner, the lock mechanism 50 is switched between a locked state where the upper belt unit 410 is fixed at the upper accommodation position with respect to the upper door unit 43 and an unlocked state where the locked state is released so that the upper belt unit 410 can rotate from the upper accommodation position to the maintenance position.

In other words, the upper belt unit 410 is fixed at the upper accommodation position with respect to the upper door unit 43 by the lock mechanism 50. The fixing mechanism may use fastening with a fastening member such as a screw, or locking with another link mechanism, instead of the lock mechanism as in the present exemplary embodiment. The fixing configuration is not limited in particular.

Instead of fully fixing the upper belt unit 410 at the upper accommodation position with respect to the upper door unit 43, the lock mechanism 50 may roughly support the upper belt unit 410. When the upper door unit 43 is closed, a part of the upper belt unit 410 may come into contact with a part of the apparatus main body (housing) 400 or a part of the lower belt unit 420 and be thereby fixed in position. Alternatively, the upper belt unit 410 may be configured to abut by its own weight.

The upper belt unit 410 abuts against the stopper 51 disposed on the upper door unit 43 and stops rotating at the maintenance position. In other words, the stopper 51 holds the upper belt unit 410 at the maintenance position when the upper door unit 43 is located at the open position. With the upper door unit 43 at the open position and the upper belt unit 410 at the maintenance position, the upper belt 411 can be pulled out to the near side of the apparatus main body 400 in the sheet width direction. The operator can replace the upper belt 411 or do maintenance in such a state.

As illustrated in FIG. 11, the gas spring 47 is provided between the upper door unit 43 and the upper belt unit 410. The gas spring 47 biases the upper belt unit 410 toward the upper accommodation position with respect to the upper door unit 43 located at the open position. The provision of the gas spring 47 can improve operability particularly when the upper belt unit 410 is heavy.

In the present exemplary embodiment, the gas spring 47 is located above the upper belt unit 410 and fastened to a fixing member 48 in the upper door unit 43 and a fixing member 49 in the upper belt unit 410 to assist the opening and closing operation of the upper belt unit 410. In the present exemplary embodiment, the gas spring 47 is located above the upper belt unit 410 and thus does not interfere with the replacement operation in replacing parts with the upper belt unit 410 opened. The biasing force of the gas spring 47 is set so that the upper belt unit 410 does not lift up unintentionally due to a weight change when parts are detached. The upper door unit 43 is held (locked) by a holding member (not illustrated) to not close with the upper belt unit 410 opened.

The upper door unit 43 and the upper belt unit 410 described above can be displaced into the following first, second, and third states. The first state refers to a state where the upper door unit 43 is located at the closed position, the upper belt unit 410 is located at the upper accommodation position, and the sheet S is conveyed by the upper belt 411 (see FIG. 6). The second state refers to a state where the upper door unit 43 is located at the open position and the upper belt unit 410 is located at the upper accommodation position to open the conveyance path of the sheet S (see FIG. 7). The third state refers to a state where the upper door unit 43 is located at the open position, the upper belt unit 410 is located at the maintenance position, and the upper belt 411 can be detached from and attached to the upper belt unit 410.

As described above, in the third state, the upper belt unit 410 is held at the substantially horizontal position. Parts such as the upper belt 411, stretching rollers, heaters, and sensors can be replaced and cleaning and lubrication operations can be performed in such a state. This eliminates the need to detach the upper door or the exterior cover, and significantly improves maintainability.

[Parts Replacement Operation of Lower Belt Unit]

Figure 12:
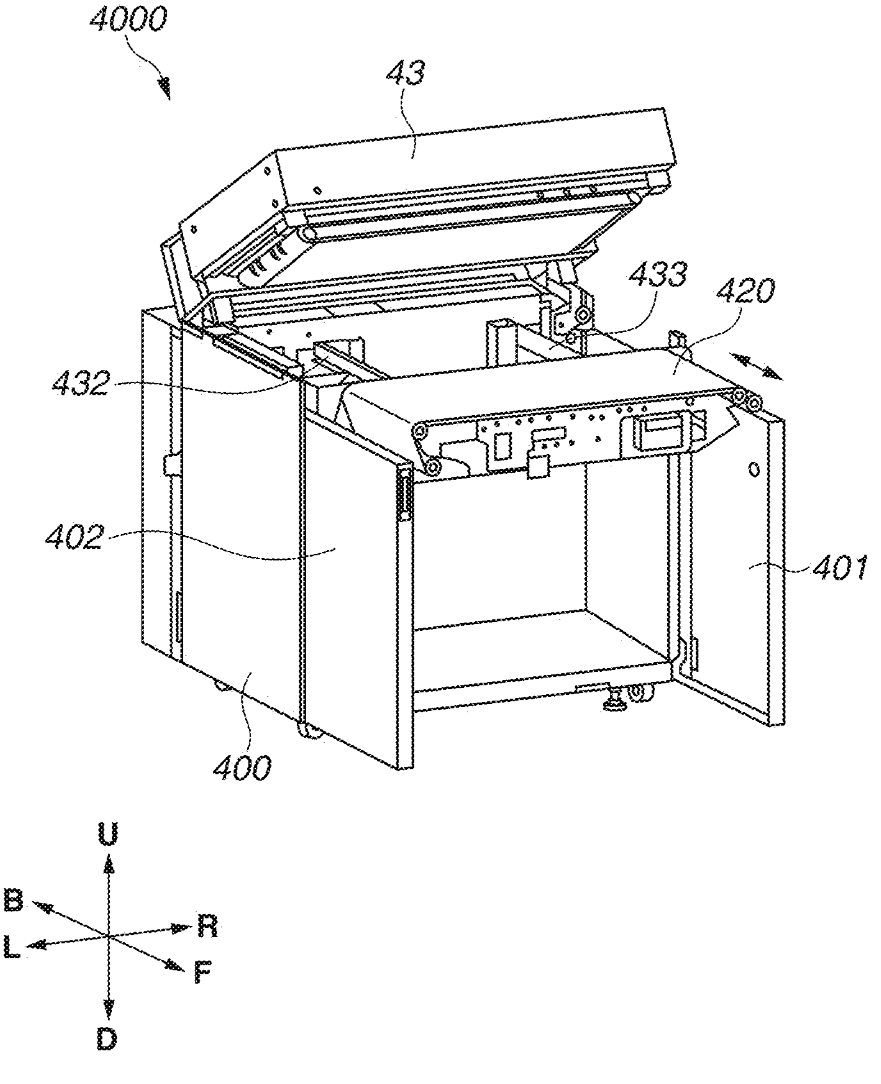
FIG. 12 is a perspective view illustrating a state where a lower belt unit is located at a pull-out position when the fixing module according to the first exemplary embodiment is in the third state.

Next, parts replacement and maintenance of the lower belt unit 420 will be described with reference to FIG. 12. With the upper door unit 43 at the open position, front double doors 401 and 402 located on the front side of the fixing module 4000 are opened. A fixing member (not illustrated) for fixing the lower belt unit 420 is detached, and the lower belt unit 420 is pulled out to the near side. The lower belt unit 420 supported by slide rail units 432 and 433, the longitudinal direction of which is the front-to-back direction, is thereby pulled out. Parts replacement, cleaning, and lubrication operations of the lower belt unit 420 can be performed in such a pulled-out state.

In the present exemplary embodiment, the slide rail units 432 and 433 are an example of second displacement units, and displace the lower belt unit 420 with respect to the apparatus main body 400 between a lower accommodation position (insertion position) where the lower belt unit 420 is accommodated in the apparatus main body 400 and a pull-out position where the lower belt unit 420 protrudes from the apparatus main body 400. The slide rail units 432 and 433 are located inside the lower belt 421. The pull-out position refers to a position where the lower belt unit 420 protrudes from the apparatus main body 400 to the front direction F side in the sheet width direction and the lower belt 421 can be detached from and attached to the lower belt unit 420. The lower belt unit 420 can be moved from the lower accommodation position to the pull-out position when the upper door unit 43 is located at the open position.

As described above, the fixing module 4000 according to the present exemplary embodiment can displace the upper door unit 43 and the upper belt unit 410 into the third state where the upper door unit 43 is located at the open position and the upper belt unit 410 is located at the maintenance position. This enables detachment and attachment of the upper belt 411 from/to the upper belt unit 410. Parts such as the upper belt 411, stretching rollers, heaters, and sensors can be replaced and clearing and lubrication operations can be performed in such a state. This eliminates the need to detach the upper door or the exterior cover, and significantly improves maintainability. Workability during maintenance such as belt replacement can thus be improved. Moreover, the fixing module 4000 according to the present exemplary embodiment holds the upper belt unit 410 at the substantially horizontal position in the third state. This can further improve the workability.

Moreover, the fixing module 4000 according to the present exemplary embodiment enables detachment and attachment of the lower belt 421 from/to the lower belt unit 420 by pulling out the lower belt unit 420 to the near side. This can improve the workability during maintenance such as belt replacement.

[Belt Replacement Operation]

In order for the foregoing fixing module 4000 to provide high-quality products, the toner image on the sheet S is desirably sufficiently heated at low temperature. For that purpose, the nip portion N between the upper belt unit 410 and the lower belt unit 420 is configured so that a uniform nip can be stably formed over a wide nip area at a low nip pressure. To form such a wide nip area, the upper belt 411 and the lower belt 421 have large diameters. If the slide rail units 432 and 433 for pulling out the lower belt unit 420 are located outside the lower belt 421 of such a large diameter, the apparatus can be even larger in size. For that reason, in the present exemplary embodiment, the slide rail units 432 and 433 are located inside the lower belt 421.

The replacement operation of the lower belt 421 in the configuration where the slide rail units 432 and 433 for pulling out the lower belt unit 420 from the apparatus main body 400 are thus located inside the lower belt 421 will be described. In general, to detach a belt stretched by a plurality of stretching rollers from a belt unit, the circumferential length of a virtual belt formed across the outer peripheral surfaces of the plurality of stretching rollers is desirably made smaller than that of the belt in a free state. In other words, at least one of the plurality of stretching rollers is desirably separated from the belt so that the belt loosely fits over the plurality of stretching rollers. There are typically two methods for reducing the circumferential length of the virtual belt. One is to largely retract at least one of the stretching rollers into the interior of the belt unit. The other is to detach at least one of the stretching rollers from the belt unit.

The former method involves largely retracting the stretching roller(s) into the interior of the belt unit. In the configuration where the slide rail units 432 and 433 are located inside the lower belt 421 like the present exemplary embodiment, the slide rail units 432 and 433 are therefore desirably laid out to circumvent the retracting area of the stretching roller(s). This results in a constraint on the layout of the slide rail units 432 and 433. For example, the slide rail unit near the retracing area of the stretching roller(s) is desirably laid out even on the inner side of the retracting area or in a range not overlapping the extension of the retracting direction. Such a layout of the slide rail units 432 and 433 can destabilize the unit support due to insufficient spacing between the slide rail units 432 and 433, or lead to increased size and cost of the apparatus to ensure a large distance between the slide rail units 432 and 433. In view of this, the present exemplary embodiment employs the method for detaching at least one of the stretching rollers to minimize the retracting amount of the stretching roller(s) into the interior of the belt unit. The configuration for replacing the lower belt 421 according to the present exemplary embodiment will now be described with reference to FIGS. 13A to 17.

Figure 13A:
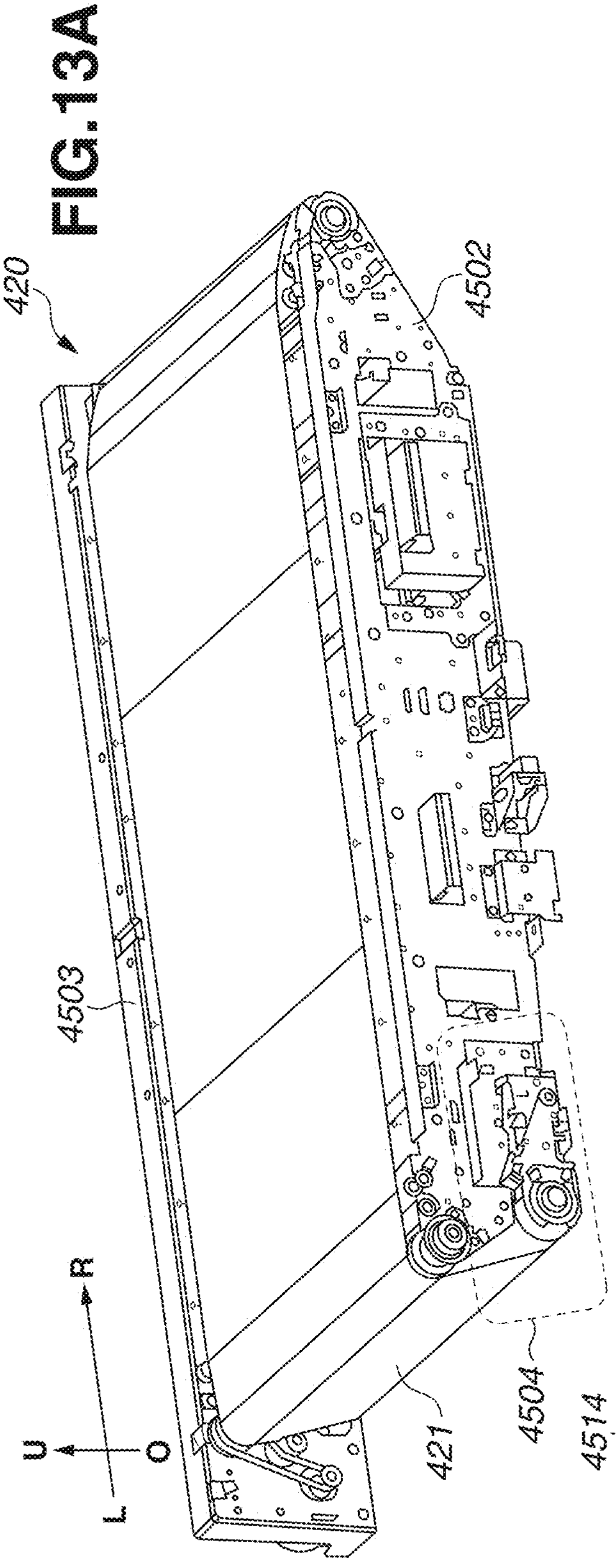
FIG. 13A is a perspective view of the lower belt unit according to the first exemplary embodiment.
Figure 13C:
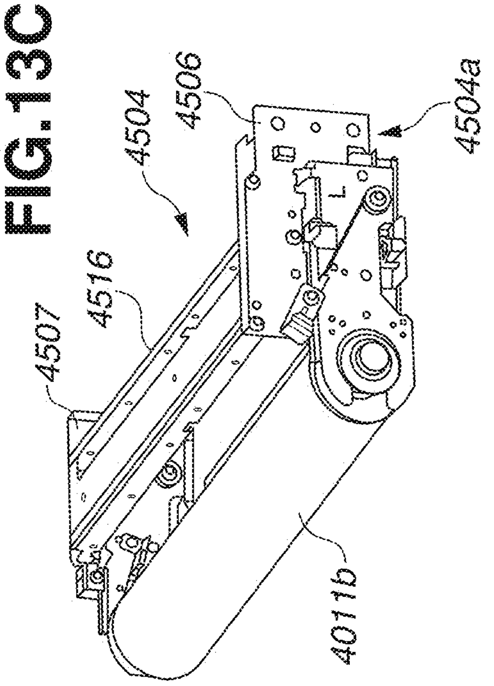
FIG. 13C is a perspective view of the tension roller unit.
Figure 13B:
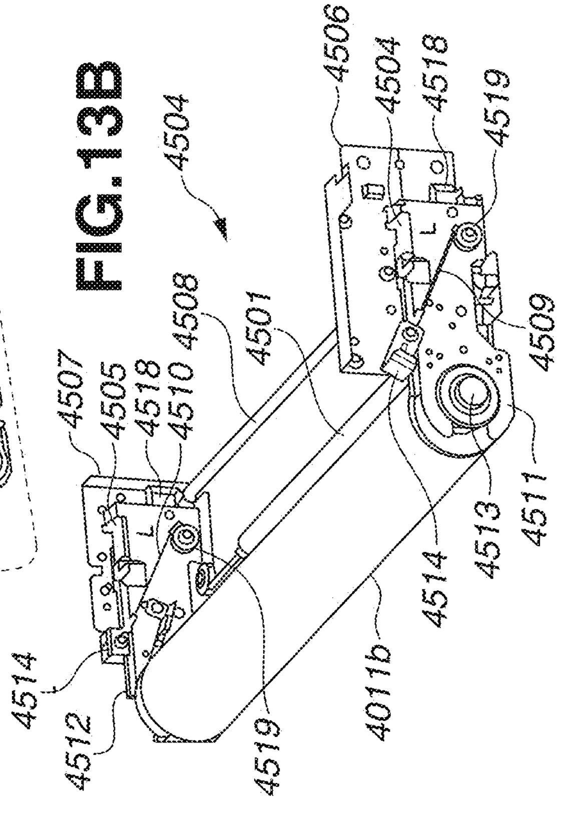
FIG. 13B is a perspective view illustrating a tension roller unit with some components omitted.
Figure 14:
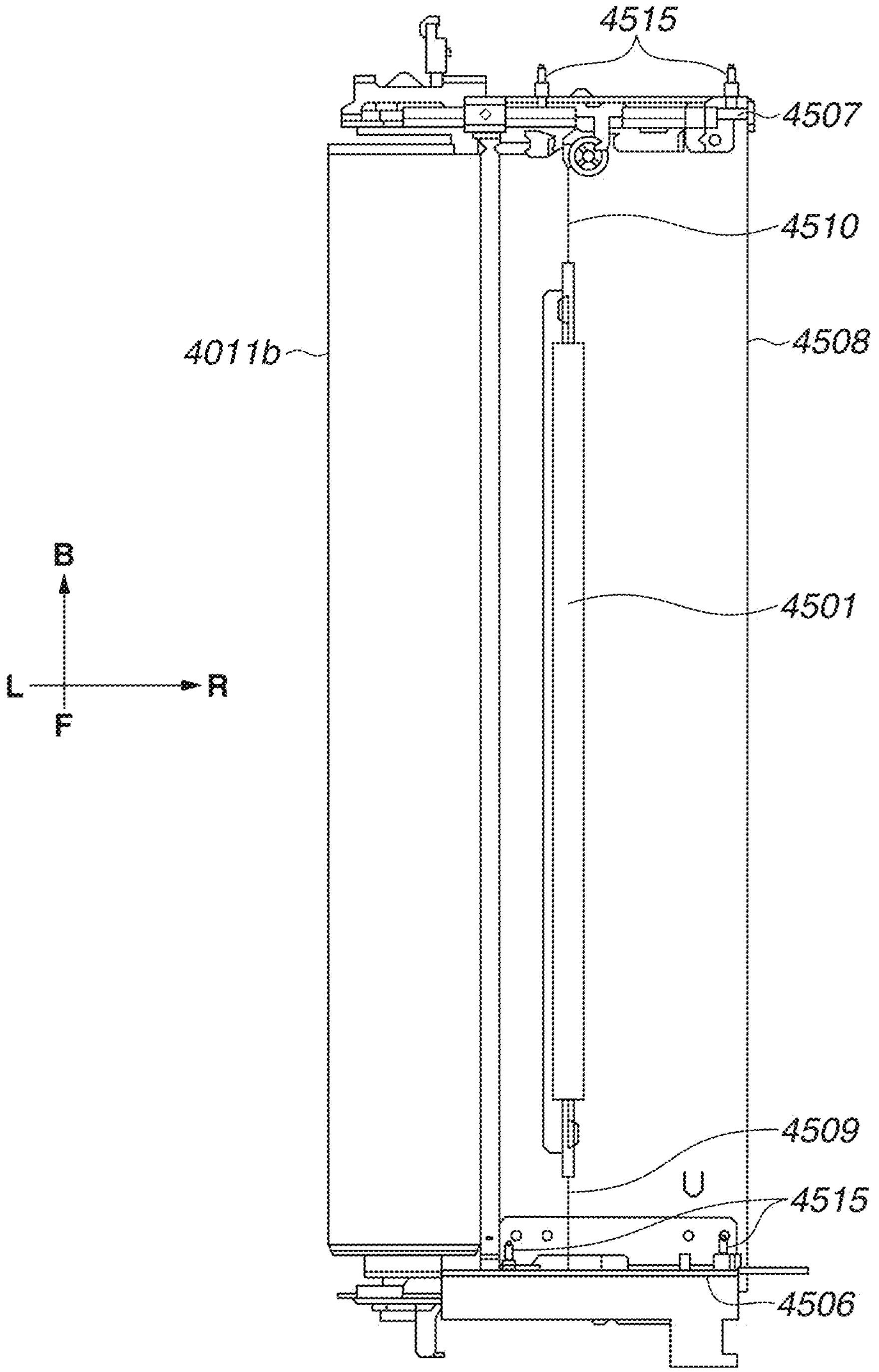
FIG. 14 is a top view illustrating the tension roller unit according to the first exemplary embodiment with some components omitted.
Figure 15:
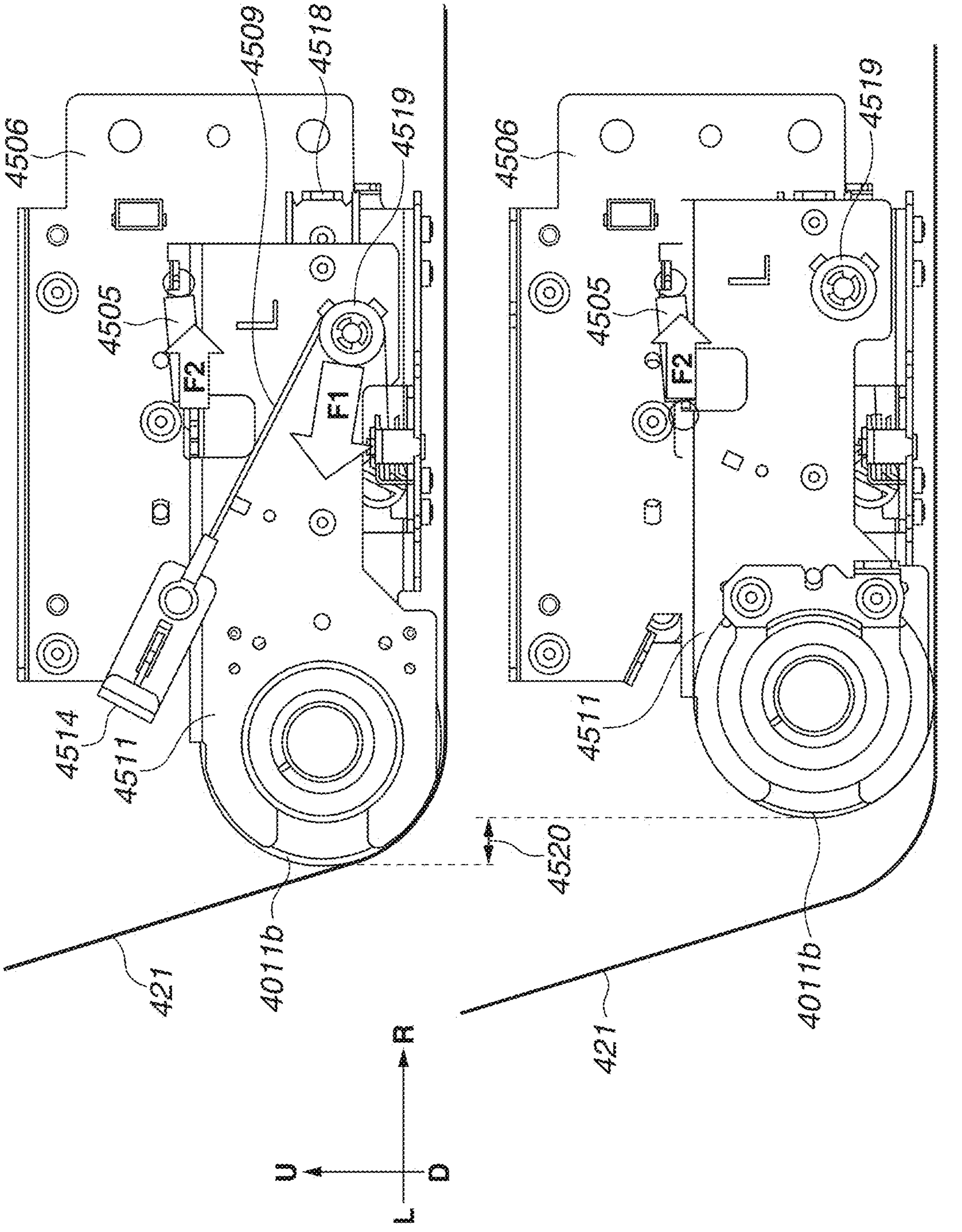
FIG. 15 is a diagram illustrating the tension roller unit and the lower belt according to the first exemplary embodiment seen from an apparatus front side, where a state where the lower belt is tensioned is illustrated to the top and a state where the lower belt is not tensioned is illustrated to the bottom.
Figure 16A:
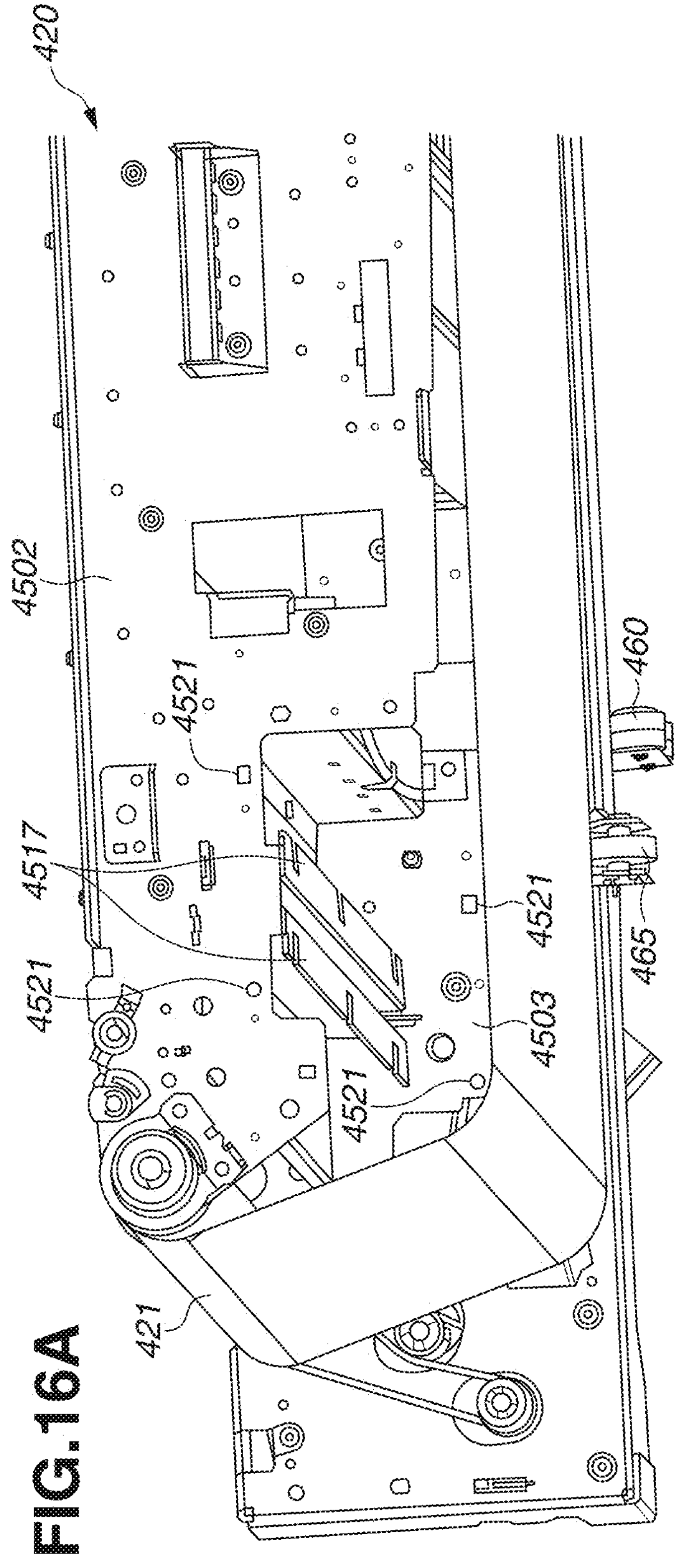
FIG. 16A is a perspective view illustrating a state where the tension roller unit is detached from the lower belt unit according to the first exemplary embodiment.
Figure 16C:
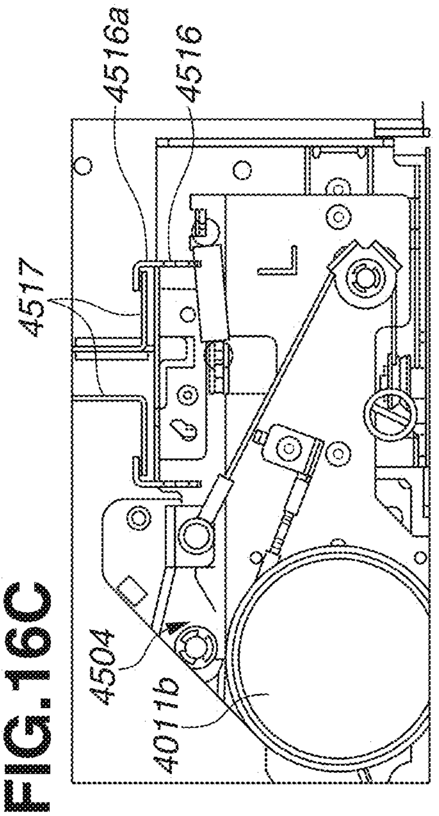
FIG. 16C is an enlarged view illustrating a state where the tension roller unit is assembled to the lower belt unit.
Figure 16B:
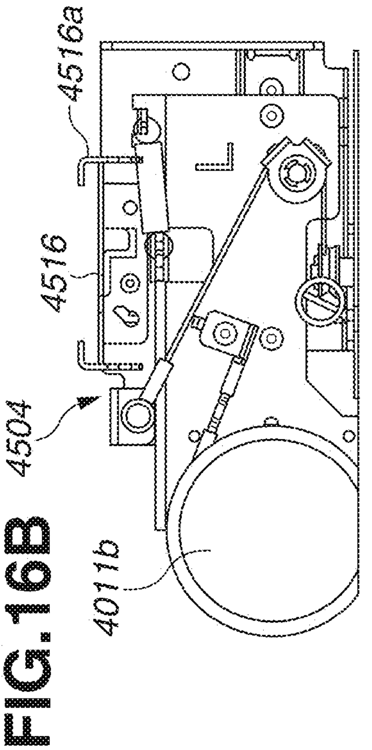
FIG. 16B is a diagram illustrating the tension roller unit detached.
Figure 17:
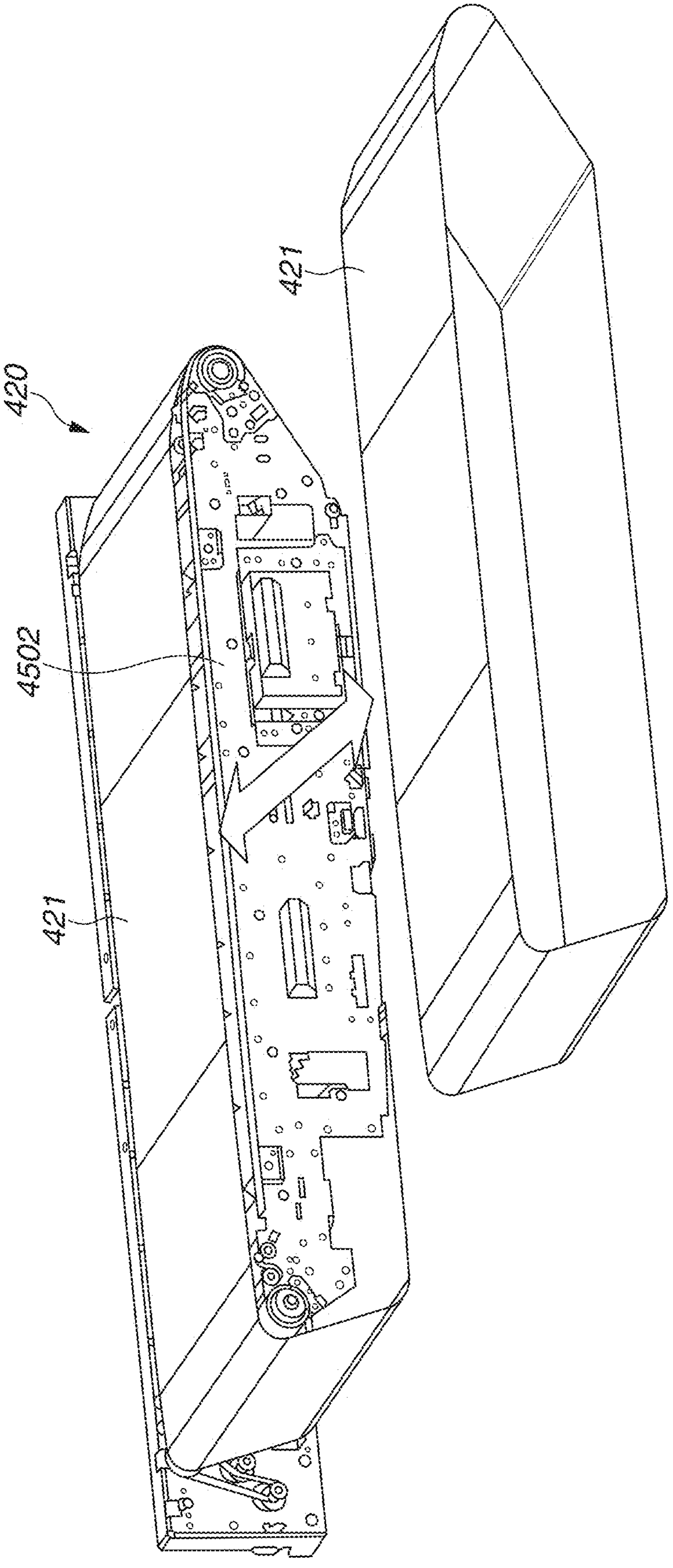
FIG. 17 is a diagram illustrating how the lower belt is detached from and attached to the lower belt unit according to the first exemplary embodiment.

FIG. 13A is a perspective view of the lower belt unit 420. FIG. 13B is a perspective view where a tension unit fixing stay 4516, which is a component of a tension roller unit 4504, is omitted. FIG. 13C is a perspective view of the tension roller unit 4504 including the tension unit fixing stay 4516. FIG. 14 is a plan view of the tension roller unit 4504 seen from above with the tension unit fixing stay 4516 omitted. FIG. 15 is a schematic diagram including two views of the tension roller unit 4504 and the lower belt 421 seen from the front of the apparatus, arranged at the top and bottom with the lower belt 421 tensioned and not tensioned, respectively. FIG. 16A is a perspective view of the lower belt unit 420 with the tension roller unit 4504 detached. FIG. 16B is a view of the detached tension roller unit 4504 seen from the front of the apparatus. FIG. 16C is an enlarged view of the tension roller unit 4504 assembled to the lower belt unit 420, seen from the front of the apparatus. FIG. 17 is a diagram illustrating how the lower belt 421 is detached from and attached to the lower belt unit 420 with the tension roller unit 4504 detached.

The tension roller unit 4504 includes the tension roller 4011*b* and a tension roller frame 4504*a*. The tension roller frame 4504*a* includes a tension unit fixing front side plate 4506 located in front, a tension unit fixing far side plate 4507 located behind, the tension unit fixing stay 4516 located at the top, and a tension unit fixing stay 4508 located at the bottom. The tension unit fixing front side plate 4506 and the tension unit fixing far side plate 4507 are connected by the tension unit fixing stays 4516 and 4508. Such a tension roller frame 4504*a* is positioned and fixed to the lower frame 424 as will be described below.

The tension roller 4011*b* is rotatably supported at the front end by a tension roller holding arm front 4511 and at the back end by a tension roller holding arm back 4512 via tension roller bearings 4513. The tension roller holding arm front 4511 and the tension roller holding arm back 4512 are held by the tension unit fixing front side plate 4506 and the tension unit fixing far side plate 4507, respectively, to be movable in a left-to-right (L-R) direction of the coordinate system via tension direction sliders 4518.

Two types of tension springs are attached to the tension roller unit 4504. One is a belt tension application spring 4501 that serves as a biasing unit and a first biasing unit for applying tension to the lower belt 421. The other is belt tension release springs 4505 that serve as second biasing units and release the belt tension. As illustrated in FIG. 14, the belt tension application spring 4501 is disposed in the front-to-back direction (F-B direction) above the lower tension unit fixing stay 4508. One end of a front wire 4509 and one end of a back wire 4510 are attached to the front and back ends of the belt tension application spring 4501, respectively. As illustrated in FIG. 13B, the other ends of the front wire 4509 and the back wire 4510 are attached to wire fixing units 4514 that are hooked on the tension unit fixing front side plate 4506 and the tension unit fixing far side plate 4507 via wire pulleys 4519.

With such a configuration, the belt tension application spring 4501 biases the tension roller 4011*b* toward the lower belt 421 and applies tension to the lower belt 421. The belt tension application spring 4501 is also connected to the tension roller 4011*b* so that the biasing of the tension roller 4011*b* can be released. Specifically, the biasing of the tension roller 4011*b* by the belt tension application spring 4501 can be released by detaching the wire fixing unit 4514 from the tension unit fixing front side plate 4506.

The belt tension release springs 4505 are attached at one end to the tension unit fixing front side plate 4506 and the tension unit fixing far side plate 4507 respectively located at the front and back, and at the other end to the tension roller holding arm front 4511 and the tension roller holding arm back 4512. As illustrated in FIGS. 15A and 15B, the belt tension release springs 4505 bias the tension roller 4011*b* in a direction away from the lower belt 421 in a state where the biasing of the tension roller 4011*b* by the belt tension application spring 4501 is released.

The belt tension release springs 4505 have a biasing force F2 smaller than a biasing force F1 of the belt tension application spring 4501. In the present exemplary embodiment, the spring force of the belt tension application spring 4501 is set to approximately 63 N, and the spring force of the belt tension release springs 4505 is set to approximately 3 N. Since the spring force of the belt tension application spring 4501 is greater than that of the belt tension release springs 4505, the tension roller 4011*b* moves in the L direction of the coordinate system as illustrated in the upper part of FIG. 15 when the two types of springs are attached. In the presence of the lower belt 421, the tension roller 4011*b* is in contact with the lower belt 421 and located at the position where the lower belt 421 has the tensioned belt circumferential length.

As illustrated in FIG. 16A, the lower belt unit 420 includes rail reception members 4517 that are disposed in the front-to-back direction inside the lower belt 421. The rail reception members 4517 are located above the space where the tension roller unit 4504 enters inside the lower belt unit 420. With the tension roller unit 4504 entered in the space, rails 4516*a* disposed in the front-to-back direction on the upper tension unit fixing stay 4516 at the top of the tension roller unit 4504 as illustrated in FIG. 16B roughly engage with the rail reception members 4517 except for the front and back portions. As illustrated in FIG. 16C, the tension roller unit 4504 can thus be inserted into and removed from the lower belt unit 420 with its orientation roughly maintained. In the present exemplary embodiment, the tension roller unit 4504 can be detached from the lower frame 424 to the front side (in the pull-out direction of the lower belt unit 420).

A lower belt unit front side plate 4502 and a lower belt unit far side plate 4503 constituting the lower frame 424 have positioning holes 4521 (FIG. 16A). With the tension roller unit 4504 attached to the internal space of the lower belt unit 420, tension unit fixing shafts 4515 disposed on the tension roller unit 4504 as illustrated in FIG. 14 engage with the positioning holes 4521, whereby the final orientation of the tension roller unit 4504 is determined. The lower belt unit front side plate 4502 is a side plate on the front side of the lower frame 424. The lower belt unit far side plate 4503 is a side plate on the back side of the lower frame 424. The tension unit fixing shafts 4515 are disposed to protrude backward from both the tension unit fixing front side plate 4506 and the tension unit fixing far side plate 4507 constituting the tension roller frame 4504*a*. With the tension roller unit 4504 positioned to the lower belt unit 420 by the tension unit fixing shafts 4515, the tension roller unit 4504 is fixed to the lower frame 424 by screwing the tension unit fixing front side plate 4506 to the lower belt unit front side plate 4502.

The procedure for attaching the lower belt 421 and the tension roller unit 4504 to the lower belt unit 420 will be described. Initially, as illustrated in FIG. 17, the lower belt 421 is fitted over the lower belt unit 420 without the tension roller unit 4504, from the front side to the far side of the apparatus. The tension roller unit 4504 is then attached to the lower belt unit 420. Here, as illustrated in the lower part of FIG. 15, the wire fixing unit 4514 is detached from the tension unit fixing front side plate 4506 so that the spring force of the belt tension application spring 4501 does not act on the tension roller 4011*b*. The spring force of the belt tension release springs 4505 thus acts to move the tension roller 4011*b* in the R direction of the coordinate system of FIG. 15 by a distance 4520. As a result, the tension roller unit 4504 can be attached without the tension roller 4011*b* rubbing strongly against the inner peripheral surface of the lower belt 421. After the tension roller unit 4504 is attached and fixed to the lower belt unit 420, the wire fixing unit 4514 is fixed to the tension unit fixing front side plate 4506, whereby the spring force of the belt tension application spring 4501 acts to apply belt tension as illustrated in the upper part of FIG. 15.

Figure 18:
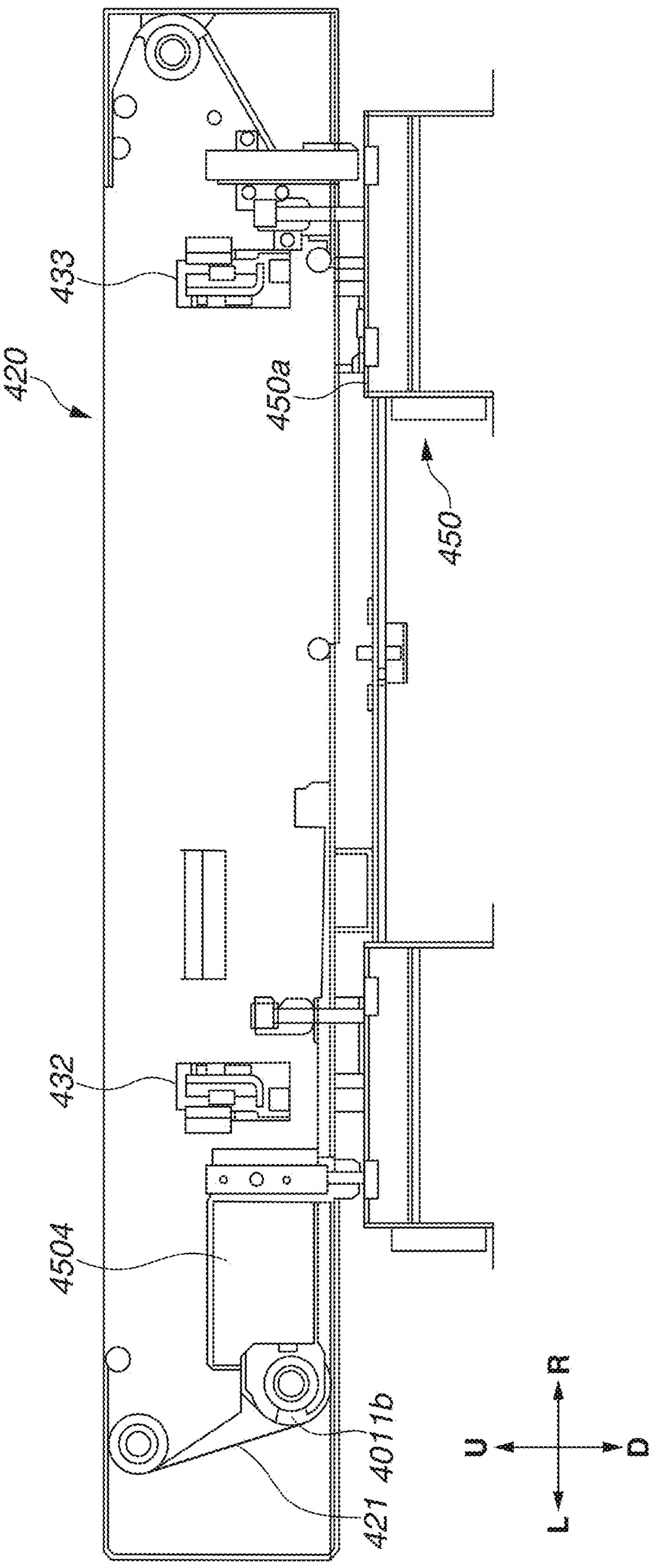
FIG. 18 is a sectional view illustrating a positional relationship between slide rail units of the lower belt unit and the tension roller unit according to the first exemplary embodiment.

The procedure for detaching the lower belt 421 is reverse to the foregoing procedure in order. Specifically, the wire fixing unit 4514 is detached from the tension unit fixing front side plate 4506 to release the biasing force of the belt tension application spring 4501. In such a state, the tension roller unit 4504 is pulled out in front from the lower frame 424 to detach the tension roller unit 4504. Here, it is sufficient for the tension roller 4011*b* to be separated from the lower belt 421 to a position where the tension roller unit 4504 can be pulled out, and the foregoing distance 4520 can thus be small. In such a state, since the lower belt 421 is loosely fitted onto the rest of the stretching rollers, the lower belt 421 can be easily pulled out to the front side. In the present exemplary embodiment, since the tension roller 4011*b* is thus detached from the lower frame 424 in replacing the lower belt 421, the amount of movement of the tension roller 4011*b* during detachment can be small. This makes interference with the slide rail units 432 and 433 located inside the lower belt 421 less likely, and the distance between the slide rail units 432 and 433 can be increased as illustrated in FIG. 18 to be described below. As a result, the lower belt unit 420 can be stably supported by the slide rail units 432 and 433.

[Configuration for Inserting and Pulling Out Lower Belt Unit]

Next, a configuration that enables the insertion and pull-out of the lower belt unit 420 into/from the apparatus main body 400 will be described with reference to FIGS. 18 to 22. The layout of the slide rail units 432 and 433 will initially be described with reference to FIGS. 18 and 19.

As described above, the slide rail units 432 and 433 for inserting and pulling out the lower belt unit 420 into/from the apparatus main body 400 are located inside the lower belt 421. The purpose is to prevent the upsizing of the apparatus and facilitate the replacement of the lower belt 421 with the lower belt unit 420 pulled out. If the slide rail units are located outside the lower belt 421, the lower belt 421 is difficult to replace in the state where the lower belt unit 420 is pulled out. In such a case, for example, the lower belt unit 420 can be detached from the apparatus main body 400 for belt replacement. However, the lower belt unit 420 with the lower belt 421 of large diameter is heavy in weight. The operation of detaching the lower belt unit 420 from the apparatus main body 400 is therefore difficult. For such a reason, in the present exemplary embodiment, the slide rail units 432 and 433 are located inside the lower belt 421 so that the lower belt 421 can be easily replaced, with the lower belt unit 420 pulled out.

As described above, in the present exemplary embodiment, the slide rail units 432 and 433 for supporting the lower belt unit 420 are located to run through the inside of the lower belt 421 from the back side of the apparatus in view of parts replaceability of the lower belt unit 420. For that purpose, the lower belt unit 420 is desirably stably supported from the back side of the apparatus via the slide rail units 432 and 433. Meanwhile, the pull-out amount of the lower belt unit 420 from the apparatus main body 400 is desirably large for the sake of easy jam handling and parts replacement. The slide rail units 432 and 433 are only fixed to the back side of the apparatus main body 400, and if the lower belt unit 420 is supported by only the slide rail units 432 and 433, the distance from the slide rail units 432 and 433 to the center of gravity of the lower belt unit 420 becomes large. This increases the force acting on the slide rail units 432 and 433 and their fixing portions. As a result, the rigidity and strength desired of the fixing portions increase, leading to the upsizing and higher cost of the apparatus. In view of this, the present exemplary embodiment uses the following simple configuration to enable a stable pull-out operation of the lower belt unit 420.

FIG. 18 is a sectional view illustrating the vicinity of the lower belt unit 420 with some components omitted to clearly show the positional relationship between the slide rail units 432 and 433 and the tension roller unit 4504. As described above, since the amount of movement of the tension roller 4011*b* in attaching and detaching the lower belt 421 is small, the left slide rail unit 432 can be located close to the tension roller unit 4504 as illustrated in FIG. 18. As a result, the slide rail units 432 and 433 can be located at a large distance from each other in the lateral direction (L-R direction). The lower belt unit 420 attached to the apparatus main body 400 is supported by the slide rail units 432 and 433 as well as support plate portions 450*a* that are part of a main body frame 450.

Figure 19:
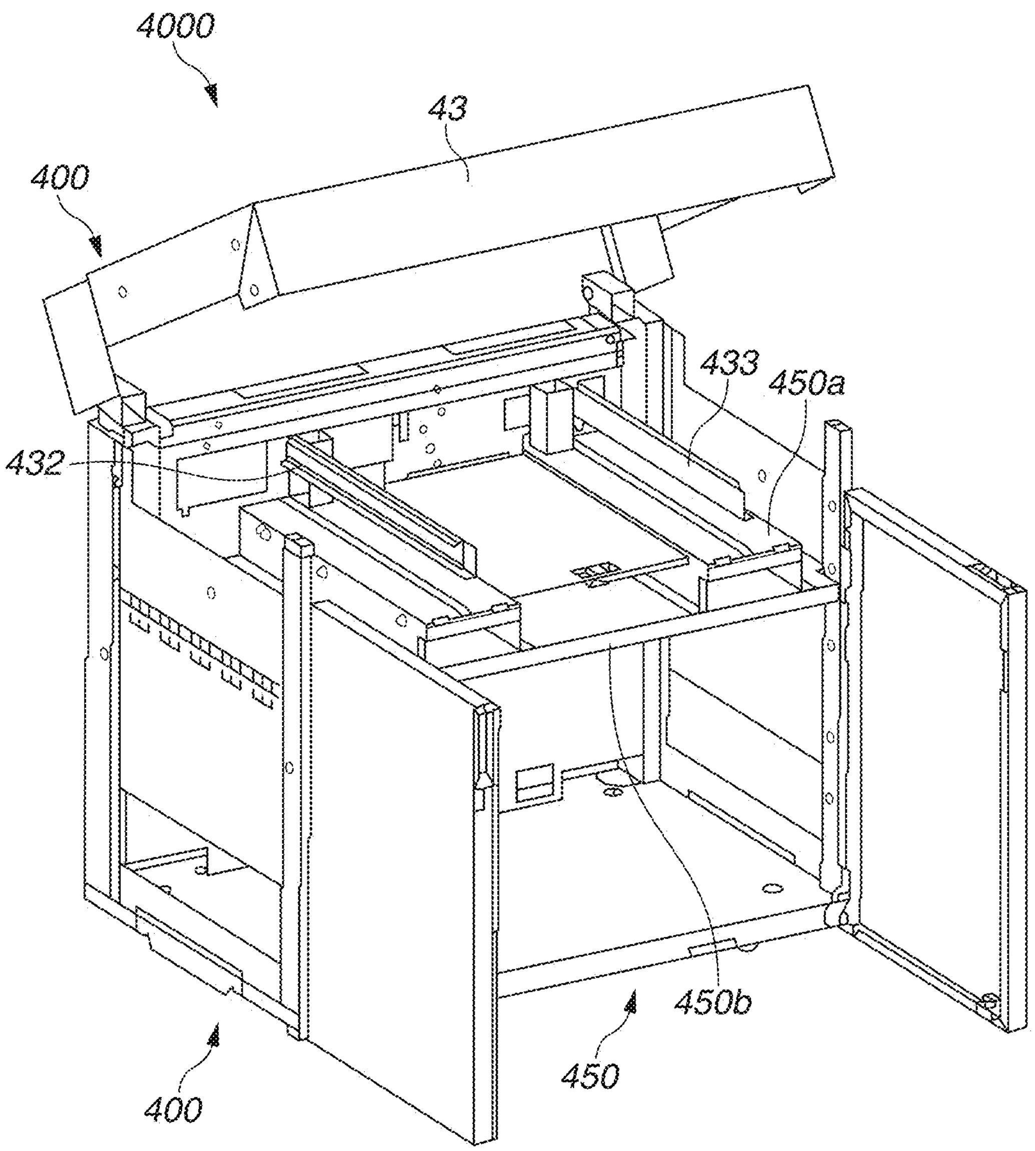
FIG. 19 is a perspective view illustrating the fixing module according to the first exemplary embodiment with the lower belt unit omitted.

FIG. 19 is a perspective view illustrating the fixing module 4000 with the lower belt unit 420 omitted. The apparatus main body 400 of the fixing module 4000 includes the main body frame 450 for supporting various devices inside the apparatus main body 400. The main body frame 450 includes a bottom plate 450*b* that is disposed to extend laterally through below the position where the lower belt unit 420 is attached.

A pair of support plate portions 450*a* is disposed on the top surface of the bottom plate 450*b* to protrude upward from the bottom plate 450*b*. The pair of support plate portions 450*a* is located under the slide rail units 432 and 433 to extend in the front-to-back direction. Alternatively, the pair of support plate portions 450*a* may be omitted and the bottom plate 450*b* may be configured to directly support the lower belt unit 420.

[Configuration for Supporting Lower Belt Unit]

Figure 20:
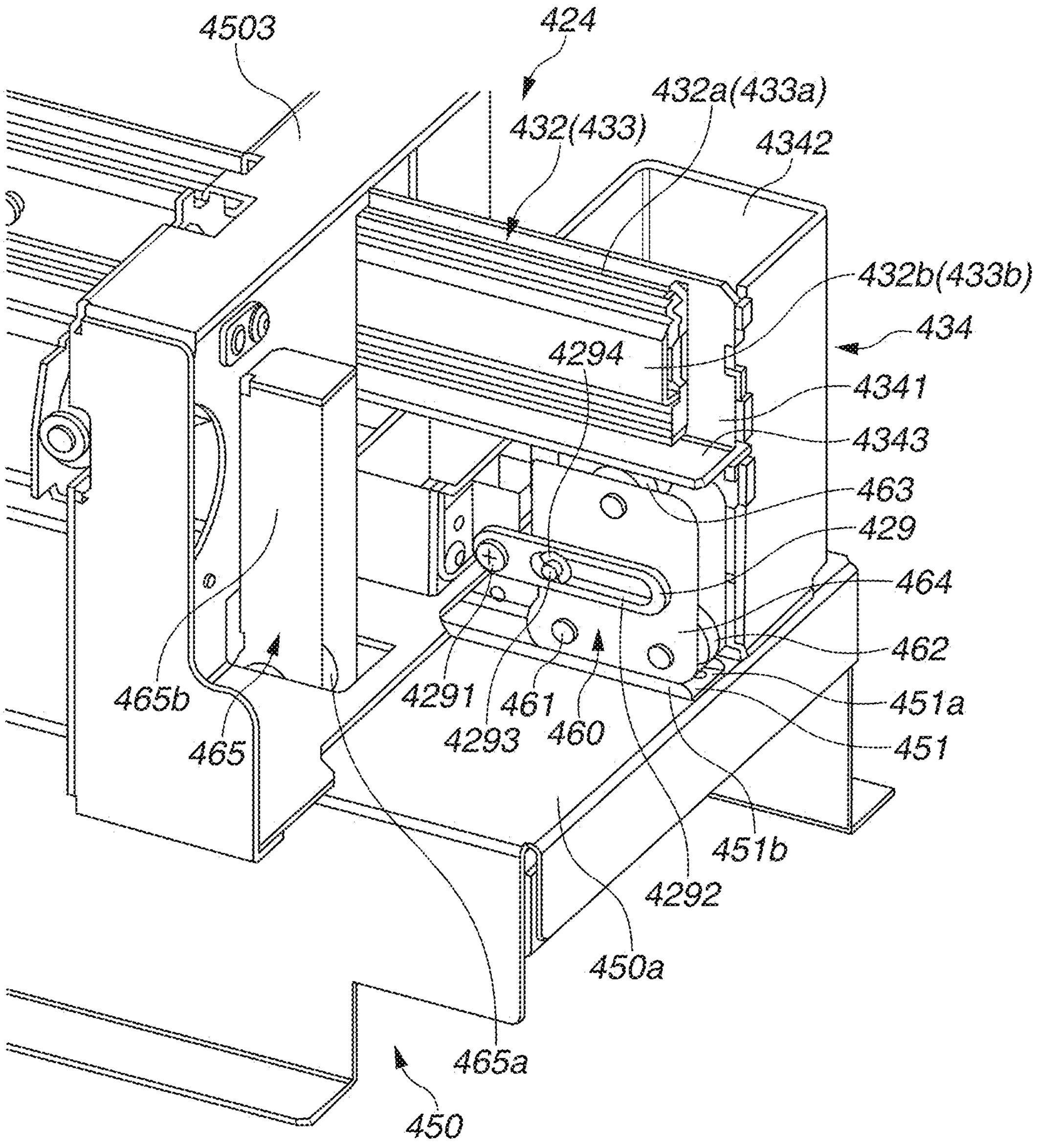
FIG. 20 is a perspective view illustrating a configuration near an auxiliary wheel unit according to the first exemplary embodiment.
Figure 21:
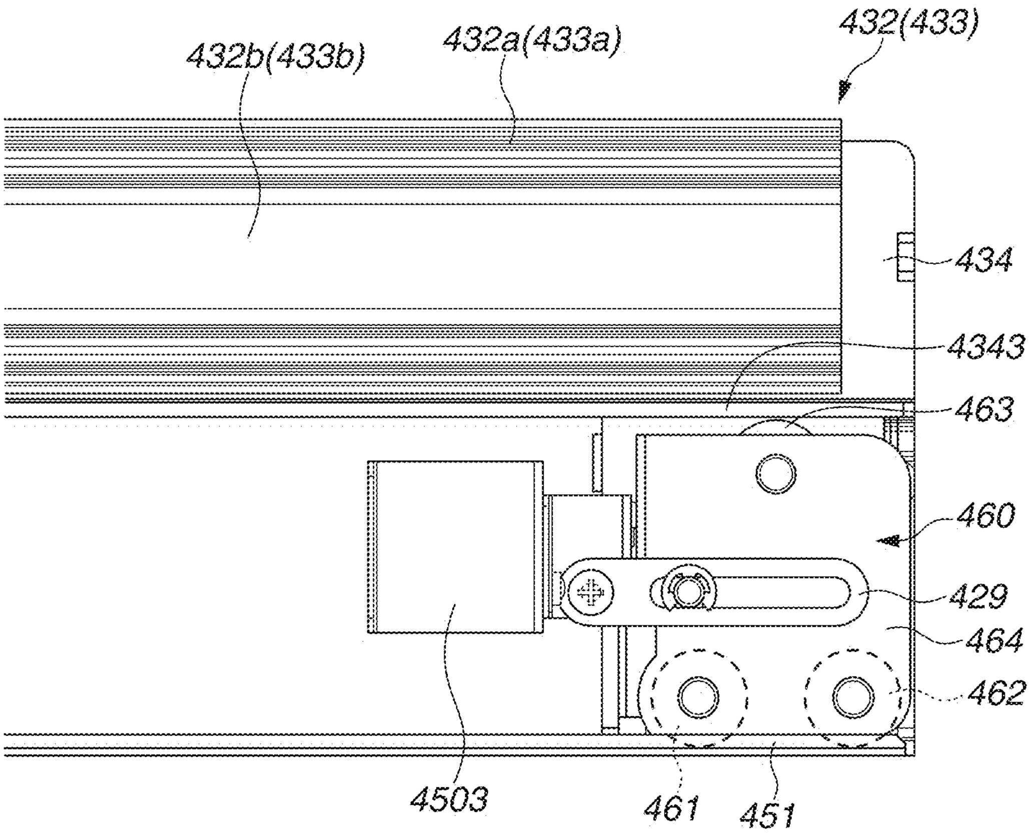
FIG. 21 is a side view illustrating the configuration near the auxiliary wheel unit according to the first exemplary embodiment.
Figure 22:
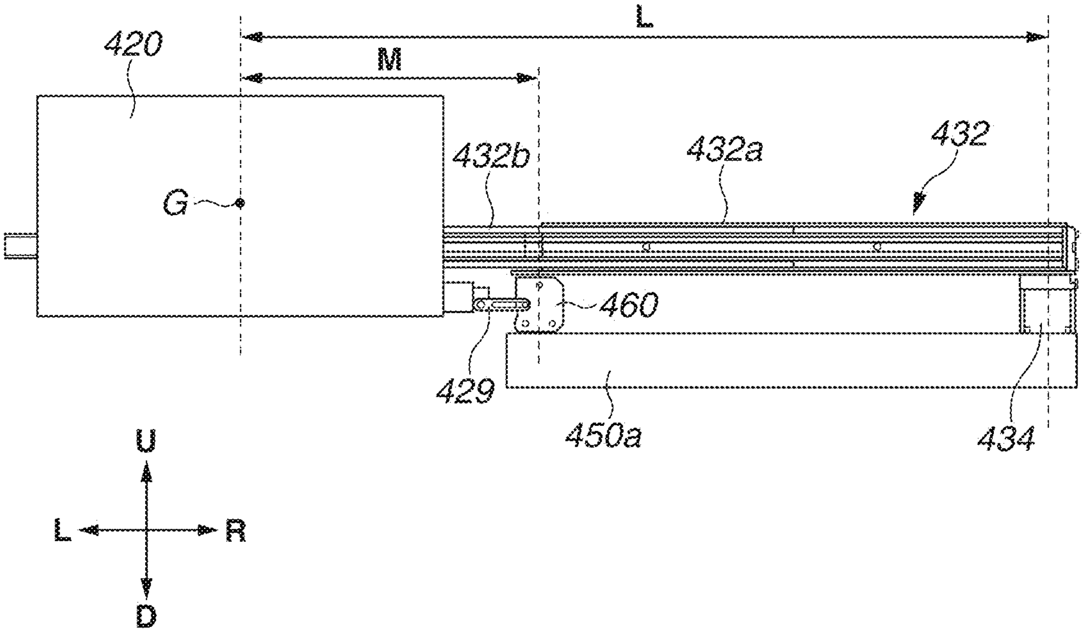
FIG. 22 is a diagram illustrating a state where the lower belt unit according to the first exemplary embodiment is pulled out.

Next, a configuration that can stably support the lower belt unit 420 even with the lower belt unit 420 pulled out will be described with reference to FIGS. 20 to 22. FIG. 20 is an enlarged perspective view of the rear part of the slide rail unit 432 when the lower belt unit 420 is attached to the apparatus main body 400. FIG. 21 is a side view thereof. FIG. 22 is a diagram illustrating a state where the lower belt unit 420 is pulled out from the apparatus main body 400.

As described above, the slide rail units 432 and 433 are located through the apparatus main body 400 to extend in the front-to-back direction. The slide rail units 432 and 433 include slide guides 432*a* and 433*a* serving as guide members, and slide members 432*b* and 433*b*, respectively. The slide guides 432*a* and 433*a* are located inside the lower belt 421 and disposed along the pull-out direction of the lower belt unit 420 (in the present exemplary embodiment, the direction from the far side to the front side). The slide members 432*b* and 433*b* are located inside the lower belt 421, and can slide along the slide guides 432*a* and 433*a*, respectively, between the insertion position where the lower belt unit 420 is inserted in the apparatus main body 400 and the pull-out position.

The slide members 432*b* and 433*b* are fixed to the lower frame 424 of the lower belt unit 420, and move in the front-to-back direction along with the lower belt unit 420 when the lower belt unit 420 is inserted and pulled out.

The insertion position refers to the position where the lower belt unit 420 is attached to the apparatus main body 400. The pull-out position refers to the position where the lower belt unit 420 is pulled out from the apparatus main body 400 as illustrated in FIG. 12 described above and FIG. 22 to be described below for the purpose of replacing the lower belt 421. Since the slide rail units 432 and 433 have a similar configuration, the following description deals mainly with the slide rail unit 432.

As illustrated in FIG. 20, the slide guide 432*a* is fixed to the main body frame 450 via a fixing portion 434. Specifically, the fixing portion 434 includes a fixing plate 4341 to which the slide guide 432*a* is fixed, and a fixing post 4342 to which the far-side end of the fixing plate 4341 is fixed. The fixing plate 4341 is disposed in the front-to-back direction along the slide guide 432*a*. The fixing post 4342 is vertically erected on the top surface of the support plate portion 450*a* constituting the main body frame 450.

In the present exemplary embodiment, the fixing plate 4341 and the slide guide 432*a* are fixed with screws. The fixing plate 4341 and the fixing post 4342 are fixed by welding. The fixing post 4342 is fixed to the support plate portion 450*a* with screws. Such a fixing portion 434 supports the lower belt unit 420 via the slide member 432*b* and the slide guide 432*a* by fixing the slide guide 432*a* to the support plate portion 450*a* of the main body frame 450 even upstream of the upstream end of the lower belt 421 in the pull-out direction when the lower belt unit 420 is at the insertion position. In other words, the slide rail unit 432 is cantilevered on the main body frame 450 by the fixing portion 434 at the far-side end of the apparatus main body 400. Note that the slide guide 432*a*, the fixing plate 4341, the fixing post 4342, and the support plate portion 450*a* may be fixed by screwing or welding. Other fixing methods such as adhesion may be used as long as sufficient fixing strength can be provided.

In the present exemplary embodiment, the lower belt unit 420 is supported using an auxiliary wheel unit 460 serving as an auxiliary support unit in addition to the foregoing configuration. The auxiliary wheel unit 460 supports the lower belt unit 420 even upstream of the upstream end of the lower belt 421 in the pull-out direction when the lower belt unit 420 is at the insertion position. The auxiliary wheel unit 460 is connected to the lower frame 424 to move with the lower belt unit 420 during the insertion and pull-out operations of the lower belt unit 420. As illustrated in FIG. 22, the auxiliary wheel unit 460 supports the lower belt unit 420 between the upstream end of the lower belt 421 and the fixing portion 434 in the pull-out direction when the lower belt unit 420 is at the pull-out position. Specifically, at the pull-out position, the auxiliary wheel unit 460 supports the lower belt unit 420 by making contact with a guide unit 451 that is a part of the main body frame 450 to be described below and an auxiliary wheel reception unit 4343. When the lower belt unit 420 is attached to the apparatus main body 400, i.e., at the insertion position, the auxiliary wheel unit 460 and the fixing portion 434 overlap in the insertion direction of the lower belt unit 420. In a cross section orthogonal to the insertion direction, the auxiliary wheel unit 460 and the fixing portion 434 are located next to each other.

Specifically, the auxiliary wheel unit 460 is located on the apparatus far side of the lower belt unit 420, and fixed to a part of the lower belt unit far side plate 4503 of the lower frame 424 via a coupling unit 429. The coupling unit 429 is fixed to the lower belt unit far side plate 4503 with a screw 4291. The coupling unit 429 has a long hole 4292 that is long in the front-to-back direction. A pin 4293 projected from a side plate 464 of the auxiliary wheel unit 460 is inserted through the long hole 4292. A retainer 4294 is engaged with the tip of the pin 4293 inserted through the long hole 4292 so that the pin 4293 does not come off the long hole 4292. The pin 4293 can move along the long hole 4929, and the auxiliary wheel unit 460 can thus move in the front-to-back direction with respect to the lower belt unit far side plate 4503 as much as the pin 4293 can move inside the long hole 4292.

The auxiliary wheel unit 460 moves in contact with a part of the main body frame 450 during the insertion and pull-out operations of the lower belt unit 420. For that purpose, the auxiliary wheel unit 460 includes three rollers (rolling members) 461, 462, and 463 serving as rotating bodies. Each of the rollers 461, 462, and 463 is rotatably supported by a pair of side plates 464. While in the present exemplary embodiment the rollers 461, 462, and 463 are configured to rotate in contact with a part of the main body frame 450, a sliding member that slides smoothly over a part of the main body frame 450 may be used instead of the rollers 461, 462, and 463.

Of the rollers 461, 462, and 463 of the auxiliary wheel unit 460, the rollers 461 and 462 serving as first contact units are located at the bottom, and the roller 463 serving as a second contact unit is located at the top. In the present exemplary embodiment, the main body frame 450 includes the guide unit 451 and the auxiliary wheel reception unit 4343 as an auxiliary support unit guide unit. The guide unit 451 serving as a first load reception unit is located vertically below the lower belt unit 420 at the insertion position. Specifically, the guide unit 451 is fixed to the top surface of the support plate portion 450*a*. The auxiliary wheel reception unit 4343 serving as a second load reception unit is located vertically above the auxiliary wheel unit 460 so that the auxiliary wheel unit 460 is sandwiched between the auxiliary wheel reception unit 4343 and the guide unit 451. Specifically, the auxiliary wheel reception unit 4343 is integrated with the fixing plate 4341 to which the slide guide 432*a* is fixed. The auxiliary wheel reception unit 4343 is formed to vertically face the guide unit 451 by folding the lower end of the fixing plate 4341.

As illustrated in FIGS. 20 and 21, the auxiliary wheel unit 460 is located between the guide unit 451 and the auxiliary wheel reception unit 4343, so that the rollers 461 and 462 contact the guide unit 451 and the roller 463 contacts the auxiliary wheel reception unit 4343. During the insertion and pull-out operations of the lower belt unit 420, the rollers 461 and 462 thus rotate in contact with the guide unit 451, and the roller 463 rotates in contact with the auxiliary wheel reception unit 4343. When the lower belt unit 420 is at the pull-out position, the rollers 461 and 462 contact the guide unit 451 and the roller 463 contacts the auxiliary wheel reception unit 4343 to support the lower belt unit 420. Specifically, part of the load of the lower belt unit 420 is supported by the auxiliary wheel unit 460 via the slide member 432*b*, the slide guide 432*a*, and the auxiliary wheel reception unit 4343. The load acting on the auxiliary wheel unit 460 is further supported by the support plate portion 450*a* of the main body frame 450 via the guide unit 451.

The number of lower rollers is desirably more than one, so that the auxiliary wheel unit 460 stands on its own when the auxiliary wheel unit 460 is assembled to the lower belt unit 420. However, the number of upper rollers and the number of lower rollers may be one or more than one each. In the present exemplary embodiment, the rollers 461, 462, and 463 have the same size. However, the rollers 461, 462, and 463 may be different in size.

In the present exemplary embodiment, the guide unit 451 has a function of guiding the movement of the auxiliary wheel unit 460 during the insertion and pull-out operations of the lower belt unit 420. For that purpose, the guide unit 451 includes a bottom plate portion 451*a* that is extended in the front-to-back direction along the top surface of the support plate portion 450*a*, and guide plate portions 451*b* that protrude upward from both ends of the bottom plate portion 451*a* and are extended in the front-to-back direction. The rollers 461 and 462 of auxiliary wheel unit 460 are placed on the bottom plate portion 451*a* and sandwiched between the pair of guide plate portions 451*b*. During the insertion and pull-out operations of the lower belt unit 420, the rollers 461 and 462 are guided in the front-to-back direction by the pair of guide plate portions 451*b*, whereby the moving direction of the auxiliary wheel unit 460 is regulated.

The lower belt unit 420 includes a support unit 465 that makes contact with the top surface of the support plate portion 450*a*, which is a part of the main body frame 450, to support the lower belt unit 420 at the insertion position. As illustrated in FIG. 20, the support unit 465 is fixed to a part of the lower belt unit far side plate 4503 and moves with the lower belt unit 420 during the insertion and pull-out operations of the lower belt unit 420. The support unit 465 includes a roller 465*a* at the bottom end, and the roller 465*a* contacts the top surface of the support plate portion 450*a*. The roller 465*a* is rotatably supported by a pair of side plates 465*b* of the support unit 465, and rotates in contact with the top surface of the support plate portion 450*a* during the insertion and pull-out operations of the lower belt unit 420.

The support unit 465 is fixed to the lower belt unit far side plate 4503 so that the lower belt unit 420 at the insertion position is positioned in the height direction. The support unit 465 supports the lower belt unit 420 while the roller 465*a* is in contact with the top surface of the support plate portion 450*a*. Note that the support unit 465 is located to not contact the top surface of the support plate portion 450*a* downstream of the auxiliary wheel unit 460 in the pull-out direction when the lower belt unit 420 is at the pull-out position.

Such a support unit 465 may be disposed on the front side of the lower belt unit 420 as well. The lower belt unit 420 then may be supported by the front-side support unit and the back-side support unit 465 when at the insertion position. In such a configuration, the front-side support unit is fixed to the lower belt unit front side plate 4502. In detaching the lower belt 421, the front-side support unit is therefore either detached from the lower belt unit front side plate 4502 or retracted to a position where the front-side support unit does not interfere with the insertion and removal of the lower belt 421.

[Details of Pull-Out Operation of Lower Belt Unit]

Next, details of the pull-out operation of the lower belt unit 420 will be described with reference to FIG. 22. FIG. 22 is a schematic diagram illustrating the state of the slide rail unit 432 and the auxiliary wheel unit 460 when the lower belt unit 420 is at the pull-out position, seen from a lateral side of the apparatus.

When the lower belt unit 420 is pulled out to the near side of the apparatus main body 400, as illustrated in FIG. 22, the auxiliary wheel unit 460 is also pulled out to the near side via the coupling unit 429 disposed on the lower belt unit 420.

In the present exemplary embodiment, the auxiliary wheel unit 460 moves with respect to the lower belt unit 420 within the range of engagement between the long hole 4292 and the pin 4293 of the coupling unit 429 so that the auxiliary wheel unit 460 lies between the guide unit 451 and the auxiliary wheel reception unit 4343 (FIGS. 20 and 21) even if the lower belt unit 420 is pulled out to the pull-out position. In other words, the distance between the auxiliary wheel unit 460 and the lower belt unit 420 at the pull-out position is greater than the distance between the auxiliary wheel unit 460 and the lower belt unit 420 at the insertion position. Alternatively, the auxiliary wheel unit 460 may be coupled to the lower belt unit 420 so that the distance between the auxiliary wheel unit 460 and the lower belt unit 420 remains unchanged regardless of the pull-out state of the lower belt unit 420.

Before the lower belt unit 420 is pulled out, the auxiliary wheel unit 460 is retracted to the area on the apparatus far side of the lower belt unit 420 as described above to not interfere with the rotating operation of the lower belt 421. Since the auxiliary wheel unit 460 is located between the auxiliary wheel reception unit 4343 and the guide unit 451, the auxiliary wheel unit 460 moves through the space therebetween to the near side of the apparatus along with the pull-out operation. The moving direction of the auxiliary wheel unit 460 is regulated by the guide unit 451 as described above, whereby the lower belt unit 420 can be prevented from being pulled out askew and the auxiliary wheel unit 460 can be prevented from wobbling with respect to the lower belt unit 420 in a direction oblique to the pull-out direction. This can prevent a failure of the pull-out operation of the lower belt unit 420 and enables a smooth pull-out operation.

As illustrated in FIG. 22, with the lower belt unit 420 pulled out to the pull-out position, the lower belt unit 420 is supported by the fixing portion 434 via the slide member 432*b* and the slide guide 432*a*. In this state, as the auxiliary wheel unit 460 moves with the lower belt unit 420, the position of the auxiliary wheel unit 460 is in front of when the lower belt unit 420 is at the insertion position. The auxiliary wheel unit 460 is sandwiched between the auxiliary wheel reception unit 4343 and the guide unit 451, and thereby supports part of the load of the lower belt unit 420 acting via the slide member 432*b* and the slide guide 432*a*. The auxiliary wheel unit 460 advanced forward thus supports part of the load of the lower belt unit 420 at a forward position away from the fixing portion 434.

With the pull-out operation of the lower belt unit 420, the slide member 432*b* fixed to the lower frame 424 is pulled out to the near side of the apparatus along the slide guide 432*a* fixed to the main body frame 450. As described above, the slide guide 432*a* is fixed to the main body frame 450 at the far side of the apparatus main body 400 via the fixing portion 434. A distance L between the center of gravity G of the lower belt unit 420 and the fixing portion 434 of the slide guide 432*a* thus increases with the pull-out operation of the lower belt unit 420. In the present exemplary embodiment, the pull-out amount of the lower belt unit 420 is 600 mm, and the weight of the lower belt unit 420 is approximately 40 kg. As the lower belt unit 420 is pulled out, the force acting on the fixing portion 434 that supports the heavy lower belt unit 420 via the slide member 432*b* and the slide guide 432*a* increases.

The force (moment) acting on the fixing portion 434 thus increases as the distance L increases due to the pull-out operation of the lower belt unit 420. To reduce the effect of the increase in the moment due to the pull-out operation, the fixing portion can be extended to the pull-out side to reduce the distance L. However, this interferes with the configuration that the slide guide 432*a* fixed to the main body frame 450 be located inside the lower belt 421, and the entire lower belt unit 420 is supported outside the lower belt 421. As a result, the lower belt unit 420 increases in size, and the belt replaceability and maintainability drop as described above.

In the present exemplary embodiment, the auxiliary wheel unit 460 also moves to the near side of the apparatus along with the pull-out operation of the lower belt unit 420. As illustrated in FIG. 22, a distance M between the center of gravity G of the lower belt unit 420 and the auxiliary wheel unit 460 does not change much regardless of the pull-out amount. In other words, while the distance L increases along with the pull-out operation of the lower belt unit 420, the distance M is maintained shorter than the increased distance L. This can reduce the force acting on the fixing portion 434 in the state where the lower belt unit 420 is pulled out.

More specifically, without the auxiliary wheel unit 460, the configuration of supporting the lower belt unit 420 with the fixing portions 434 via the slide rail units 432 and 433 is a cantilevered configuration. By contrast, in the present exemplary embodiment, the auxiliary wheel unit 460 can move along with the pull-out operation of the lower belt unit 420 to constitute a double-supported configuration.

After the maintenance or belt replacement operation, the pulled-out lower belt unit 420 is pushed in to the insertion position in the apparatus main body 400. Here, the coupling unit 429 comes into contact with the auxiliary wheel unit 460 and pushes the auxiliary wheel unit 460 in to the far side of the apparatus. When the lower belt unit 420 is restored to the insertion position, the auxiliary wheel unit 460 can also return to the position on the far side of the lower belt unit 420.

In the present exemplary embodiment like this, the auxiliary wheel unit 460 supports the lower belt unit 420 between the upstream end of the lower belt 421 and the fixing portion 434 in the pull-out direction when the lower belt unit 420 is at the pull-out position. The presence of the auxiliary wheel unit 460 thus prevents the upsizing of the apparatus and enables the replacement of the lower belt 421 with the lower belt unit 420 pulled out from the apparatus main body 400. In other words, in the configuration where the slide rail units 432 and 433 run through the inside of the lower belt 421 for the sake of belt replacement and maintenance such as lubrication, part of the load of the lower belt unit 420 pulled out is supported by the auxiliary wheel unit 460 between the upstream end of the lower belt 421 and the fixing portion 434 in the pull-out direction. This can reduce the force acting on the fixing portions 434 that support the slide rail units 432 and 433 with the lower belt unit 420 pulled out. The pull-out operation of the lower belt unit 420 can thus be stably performed without increasing the size of the fixing portions 434 and without impairing the maintainability at the pull-out position.

A second exemplary embodiment will be described with reference to FIG. 23. In the foregoing first exemplary embodiment, the auxiliary wheel units 460 are described to be fixed to the lower frame 424. By contrast, in the present exemplary embodiment, auxiliary wheel units 460A are fixed to slide members 432*b* and 433*b*. The rest of the configuration and operation are similar to those of the first exemplary embodiment. Components similar to those of the first exemplary embodiment are therefore denoted by the same reference numerals, and a description and illustration thereof will be omitted or simplified. Hereinafter, differences from the first exemplary embodiment will mainly be described.

Figure 23:
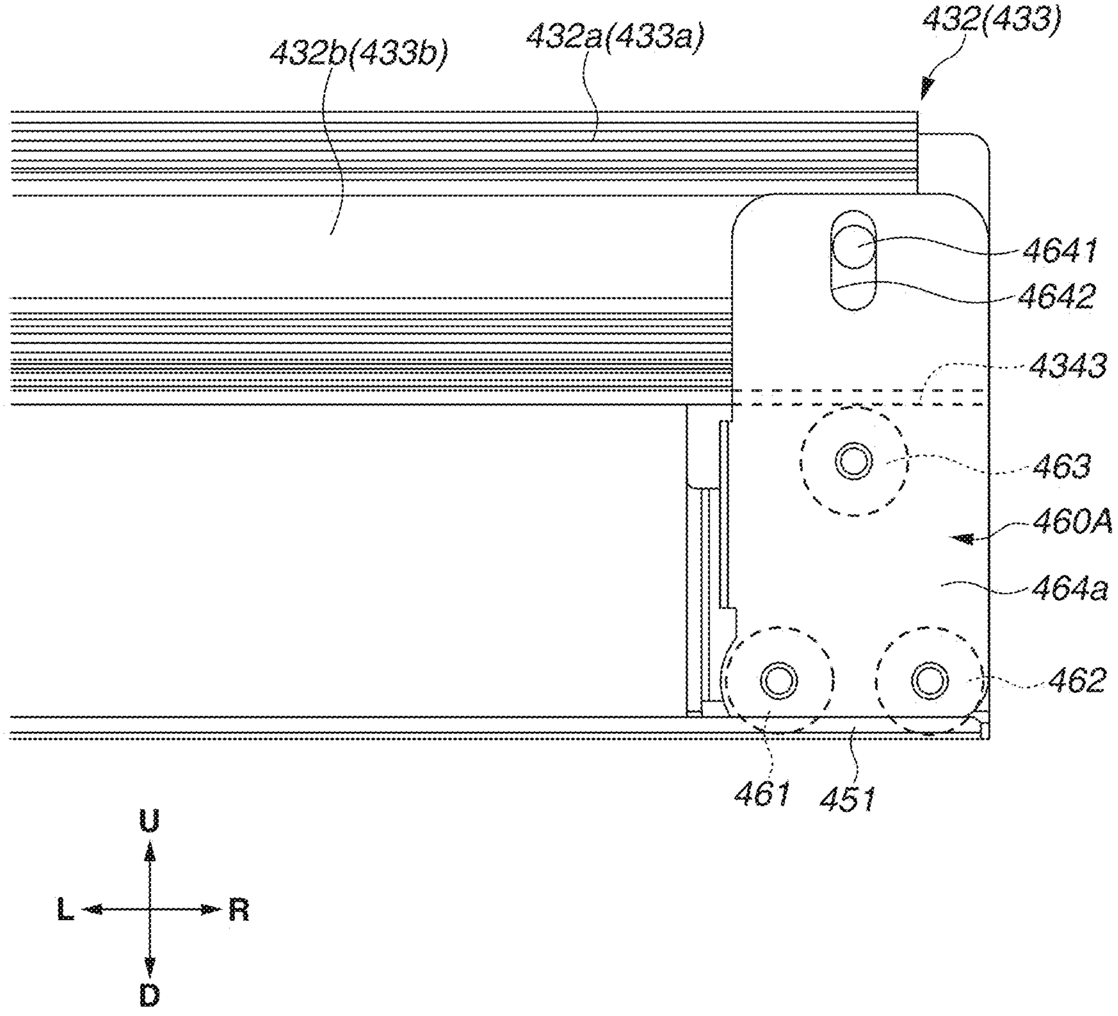
FIG. 23 is a side view illustrating a configuration near an auxiliary wheel unit according to a second exemplary embodiment.

FIG. 23 is an enlarged view of the vicinity of an auxiliary wheel unit 460A according to the present exemplary embodiment, seen from a lateral side. In the present exemplary embodiment, the auxiliary wheel units 460A serving as auxiliary support units are disposed on the slide members 432*b* and 433*b* that are movable parts of the slide rail units 432 and 433. Specifically, side plates 464A that support the rollers 461, 462, and 463 are extended up to the slide members 432*b* and 433*b*. The side plates 464A are fixed to the slide members 432*b* and 433*b* with stepped screws 4641. The side plates 464A each have a long hole 4642 that is long in the vertical direction. The stepped screws 4641 are fixed to the slide members 432*b* and 433*b* via the long holes 4642. This enables adjustment of the vertical positions of the auxiliary wheel units 460A with respect to the slide members 432*b* and 433*b*.

Again, in the present exemplary embodiment, the rollers 461 and 462 contact the guide unit 451, and the roller 463 contacts the auxiliary wheel reception unit 4343. When the lower belt unit 420 is pulled out from the apparatus main body 400, the rollers 461 and 462 thus rotate in contact with the guide unit 451, and the roller 463 rotates in contact with the auxiliary wheel reception unit 4343. The auxiliary wheel units 460A fixed to the slide members 432*b* and 433*b* are pulled out along with the lower belt unit 420. Like the first exemplary embodiment, the force acting on the fixing portions 434 in the state where the lower belt unit 420 is pulled out can thus be reduced. This can prevent the upsizing of the apparatus and enables the replacement of the lower belt 421 with the lower belt unit 420 pulled out from the apparatus main body 400.

In the configuration of the foregoing first exemplary embodiment, unlike the present exemplary embodiment, the auxiliary wheel units 460 are not disposed on the slide members 432*b* and 433*b*. The auxiliary wheel units 460 can therefore be located at a position away from the lower belt unit 420. By contrast, in the present exemplary embodiment, there is a constraint on the layout of the auxiliary wheel units 460A that the auxiliary wheel units 460A be disposed within the range of the slide members 432*b* and 433*b*. However, unlike the first exemplary embodiment, the configuration without the coupling units 429 is simpler and advantageous in terms of the ease of assembly.

<Other Exemplary Embodiments>

In the foregoing exemplary embodiments, the auxiliary wheel units 460 and 460A are configured to move in contact with a part of the main body frame 450 during the insertion and pull-out operations of the lower belt unit 420. However, the auxiliary wheel unit 460 may be configured to not contact any part of the main body frame 450 while the support unit 465 is in contact with a part of the main body frame 450, and comes into contact with a part of the main body frame 450 in a state where the lower belt unit 420 is pulled out and the support unit 465 is no longer in contact with a part of the main body frame 450.

The foregoing exemplary embodiments have been described to be applied to the fixing module 4000. However, the belt modules according to the exemplary embodiments are not limited thereto and can be applied to any apparatus where a belt unit is pulled out from the apparatus main body to replace a belt. For example, the exemplary embodiments can be applied to the cooling module 5000 (cooling apparatus).

The exemplary embodiments have been described to be applied to the image forming system 1 serving as an image forming apparatus. However, this is not restrictive. For example, the exemplary embodiments can be applied to electrophotographic image forming apparatuses using toner, in which case similar effects to those of the exemplary embodiments can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-177811, filed Oct. 13, 2023, which is hereby incorporated by reference herein in its entirety.

What is claimed is:

1. A belt module comprising:

an apparatus main body; and a belt unit configured to be inserted into and pulled out from the apparatus main body, the belt unit including an endless belt configured to rotate, the endless belt being replaceable at a pull-out position where the belt unit is pulled out from the apparatus main body, wherein the apparatus main body includes:

a main body frame, a guide member located inside the endless belt and disposed along a pull-out direction of the belt unit, a slide member located inside the endless belt and configured to slide along the guide member between an insertion position where the belt unit is inserted in the apparatus main body and the pull-out position, and a fixing portion configured to fix the guide member to the main body frame upstream of an upstream end of the endless belt in the pull-out direction at the insertion position and support the belt unit via the slide member and the guide member, wherein the belt unit includes:

the endless belt, a plurality of stretching members configured to stretch the belt, and a belt frame fixed to the slide member and configured to support the plurality of stretching members, wherein the belt module further comprises an auxiliary support unit configured to, at the insertion position, support the belt unit upstream of the upstream end of the endless belt in the pull-out direction, and at the pull-out position, support the belt unit between the upstream end of the endless belt and the fixing portion in the pull-out direction, and wherein, in a case where the belt unit is at the insertion position, the auxiliary support unit and the fixing portion overlap in an insertion direction.

2. The belt module according to claim 1, wherein the belt unit includes a support unit configured to, at the insertion position, contact a part of the main body frame and support the belt unit, and wherein, at the pull-out position, the support unit is located to not contact the part of the main body frame.

3. The belt module according to claim 1, wherein the auxiliary support unit is configured to move in contact with a part of the main body frame during insertion and pull-out operations of the belt unit.

4. The belt module according to claim 3, wherein the auxiliary support member includes a rotating body configured to rotate in contact with the part of the main body frame during the insertion and pull-out operations of the belt unit.

5. The belt module according to claim 3, wherein the main body frame includes an auxiliary support unit guide unit configured to guide movement of the auxiliary support unit during the insertion and pull-out operations of the belt unit.

6. The belt module according to claim 1, wherein one of the pluralities of stretching members is configured to be detachable from the belt frame in the pull-out direction.

7. The belt module according to claim 6, wherein the one of the plurality of stretching members is a tension roller configured to apply tension to the endless belt, and wherein the belt unit includes a biasing unit configured to bias the tension roller toward the endless belt.

8. The belt module according to claim 7, wherein the biasing unit is a first biasing unit connected to the tension roller so that biasing of the tension roller is releasable, wherein the belt unit includes a second biasing unit configured to, in a state where the biasing of the tension roller by the first biasing unit is released, bias the tension roller in a direction away from the endless belt, and wherein the second biasing unit has a biasing force smaller than that of the first biasing unit.

9. The belt module according to claim 1, wherein the main body frame includes a first load reception unit located vertically below the belt unit at the insertion position and a second load reception unit located vertically above the auxiliary support unit so that the auxiliary support unit is sandwiched between the first load reception unit and the second load reception unit, and wherein the auxiliary support unit includes a first contact unit configured to contact the first load reception unit and a second contact unit configured to contact the second load reception unit, and the auxiliary support unit supports the belt unit by the first contact unit contacting the first load reception unit and the second contact unit contacting the second load reception unit at the pull-out position.

10. The belt module according to claim 9, wherein the first contact unit and the second contact unit are rotating bodies configured to rotate in contact with the first load reception unit and the second load reception unit, respectively, during insertion and pull-out operations of the belt unit.

11. The belt module according to claim 1, further comprising a heating section configured to heat the belt.

* * * * *